(12) United States Patent
Yang et al.

(10) Patent No.: US 12,330,681 B2
(45) Date of Patent: Jun. 17, 2025

(54) TRAJECTORY PLANNING METHOD AND APPARATUS

(71) Applicant: Shenzhen Yinwang Intelligent Technologies Co., Ltd., Shenzhen (CN)

(72) Inventors: Shaoyu Yang, Beijing (CN); Weize Zhang, Shenzhen (CN); Xinyu Wang, Beijing (CN)

(73) Assignee: Shenzhen Yinwang Intelligent Technologies Co., Ltd., Shenzhen (CN)

( * ) Notice: Subject to any disclaimer, the term of this patent is extended or adjusted under 35 U.S.C. 154(b) by 345 days.

(21) Appl. No.: 17/855,175

(22) Filed: Jun. 30, 2022

(65) Prior Publication Data

US 2022/0379920 A1    Dec. 1, 2022

Related U.S. Application Data

(63) Continuation of application No. PCT/CN2020/139888, filed on Dec. 28, 2020.

(30) Foreign Application Priority Data

Dec. 31, 2019    (CN) .......................... 201911424846.7

(51) Int. Cl.
*B60W 60/00* (2020.01)
*B60W 30/09* (2012.01)
*B60W 30/12* (2020.01)

(52) U.S. Cl.
CPC ........ *B60W 60/0015* (2020.02); *B60W 30/09* (2013.01); *B60W 30/12* (2013.01);
(Continued)

(58) Field of Classification Search
CPC .. B60W 60/0015; B60W 30/09; B60W 30/12; B60W 2520/10; B60W 2552/30;
(Continued)

(56) References Cited

U.S. PATENT DOCUMENTS 9,457,807 B2    10/2016    Lee et al.
10,452,070 B2    10/2019    Greenfield et al.
(Continued)

FOREIGN PATENT DOCUMENTS

CN    104571112 A    4/2015
CN    106828493 A    6/2017
(Continued)

OTHER PUBLICATIONS

R. Katsuki, T. Tasaki and T. Watanabe, "Graph Search Based Local Path Planning with Adaptive Node Sampling," 2018 IEEE Intelligent Vehicles Symposium (IV), Changshu, China, 2018, pp. 2084-2089, doi: 10.1109/IVS.2018.8500396. (Year: 2018).*

(Continued)

*Primary Examiner* — Russell Frejd
*Assistant Examiner* — Ana D Thomas
(74) *Attorney, Agent, or Firm* — Leydig, Voit & Mayer, Ltd.

(57) ABSTRACT

A trajectory planning method for an autonomous vehicle includes a lateral displacement planner that plans a preliminary traveling trajectory for an autonomous driving vehicle based on perceptual data, positioning data, and map information, where the preliminary traveling trajectory includes N road points, and each road point includes coordinate information of the road point and allowable lateral error information of the road point. A longitudinal speed planner inherits all or some of the N road points output by the lateral displacement planner and determines speed information of a subset of the N road points based on traffic road condition information and the perception data to obtain a target traveling trajectory. The speed information is a drivable speed of the autonomous driving vehicle. The target traveling trajectory includes the subset of the N road points, each (Continued)

including the drivable speed of the autonomous driving vehicle.

14 Claims, 21 Drawing Sheets

(52) U.S. Cl.
CPC ..... *B60W 2520/10* (2013.01); *B60W 2552/30* (2020.02); *B60W 2554/802* (2020.02); *B60W 2556/40* (2020.02); *B60W 2720/10* (2013.01)

(58) Field of Classification Search
CPC ....... B60W 2554/802; B60W 2556/40; B60W 2720/10; B60W 2520/105; G05D 1/0259; G05D 1/0276
See application file for complete search history.

(56) References Cited

U.S. PATENT DOCUMENTS

| | | | |
|---|---|---|---|
| 10,571,922 | B2 | 2/2020 | Greenfield et al. |
| 2012/0022739 | A1 | 1/2012 | Zeng |
| 2012/0035788 | A1 | 2/2012 | Trepagnier et al. |
| 2015/0298692 | A1 | 10/2015 | Minemura et al. |
| 2015/0353082 | A1* | 12/2015 | Lee ............... B60W 10/20 701/41 |
| 2016/0313133 | A1 | 10/2016 | Zeng et al. |
| 2018/0356819 | A1 | 12/2018 | Mahabadi et al. |
| 2019/0088148 | A1 | 3/2019 | Jacobus et al. |
| 2020/0379461 | A1* | 12/2020 | Singh ............... G05D 1/0088 |

FOREIGN PATENT DOCUMENTS

| | | |
|---|---|---|
| CN | 107121980 A | 9/2017 |
| CN | 107215339 A | 9/2017 |
| CN | 107856733 A | 3/2018 |
| CN | 108427417 A | 8/2018 |
| CN | 108445886 A | 8/2018 |
| CN | 108931981 A | 12/2018 |
| CN | 109085820 A | 12/2018 |
| CN | 109109863 A | 1/2019 |
| CN | 109375632 A | 2/2019 |
| CN | 109733386 A | 5/2019 |
| CN | 109765887 A | 5/2019 |
| CN | 109799828 A | 5/2019 |
| CN | 109814550 A | 5/2019 |
| CN | 109814576 A | 5/2019 |
| CN | 109960261 A | 7/2019 |
| CN | 109976329 A | 7/2019 |
| CN | 109976355 A | 7/2019 |
| CN | 110162023 A | 8/2019 |
| CN | 110196592 A | 9/2019 |
| CN | 110262488 A | 9/2019 |
| CN | 110281912 A | 9/2019 |
| CN | 110362096 A | 10/2019 |
| CN | 110366710 A | 10/2019 |
| CN | 110379193 A | 10/2019 |
| CN | 110471408 A | 11/2019 |
| CN | 110595475 A | 12/2019 |
| CN | 110621541 A | 12/2019 |
| CN | 110825095 A | 2/2020 |
| CN | 111123952 B | 12/2021 |
| DE | 102008016377 A1 | 10/2009 |
| DE | 102018204101 A1 | 9/2019 |
| DE | 102018004662 A1 | 12/2019 |
| EP | 3306431 A1 | 4/2018 |
| KR | 20160055711 A | 5/2016 |
| TW | I674984 B | 10/2019 |
| WO | 2010048611 A1 | 4/2010 |
| WO | 2019196334 A1 | 10/2019 |

OTHER PUBLICATIONS

S. Wang et al., "Reference Path Correction for Autonomous Ground Vehicles Driving Over Rough Terrain," 2019 IEEE Intelligent Vehicles Symposium (IV), Paris, France, 2019, pp. 2405-2410, doi: 10.1109/IVS.2019.8813812. (Year: 2019).*

* cited by examiner

TRAJECTORY PLANNING METHOD AND APPARATUS

CROSS-REFERENCE TO RELATED APPLICATIONS

This application is a continuation of International Application No. PCT/CN2020/139888 filed on Dec. 28, 2020, which claims priority to Chinese Patent Application No. 201911424846.7 filed on Dec. 31, 2019. The disclosures of the aforementioned applications are hereby incorporated by reference in their entireties.

TECHNICAL FIELD

This disclosure relates to the field of autonomous driving, and in particular, to a trajectory planning method and apparatus.

BACKGROUND

Artificial intelligence (AI) is a theory, a method, a technology, or an application system that simulates, extends, and expands human intelligence by using a digital computer or a machine controlled by the digital computer, to perceive an environment, obtain knowledge, and achieve an optimal result based on the knowledge. In other words, artificial intelligence is a branch of computer science, and is intended to understand the essence of intelligence and produce a new intelligent machine that can react in a manner similar to human intelligence. Artificial intelligence is to study design principles and implementation methods of various intelligent machines, so that the machines have perceiving, inference, and decision-making functions. Research in the field of artificial intelligence include a robot, natural language processing, computer vision, decision-making and inference, human-computer interaction, recommendation and search, an AI basic theory, and the like.

Autonomous driving is a mainstream application in the field of artificial intelligence. An autonomous driving technology depends on computer vision, a radar, a monitoring apparatus, a global positioning system, and the like to collaborate with each other, to implement autonomous driving of a motor vehicle without human intervention. An autonomous driving vehicle uses various computing systems to assist in transporting passengers from one location to another location. Some autonomous driving vehicles may require some initial or continuous input from operators (such as navigators, drivers, or passengers). An autonomous driving vehicle allows an operator to switch from a manual operation mode to an autonomous driving mode or allows a mode between the manual operation mode and the autonomous driving mode. Because the autonomous driving technology does not require a human to drive a motor vehicle, a human driving failure can be effectively avoided in theory, traffic accidents can be reduced, and road transportation efficiency can be improved. Therefore, the autonomous driving technology attracts increasing attention.

In the field of autonomous driving technologies, trajectory planning of an autonomous driving vehicle can implement selection and optimization for a path (the path is also referred to as a "trajectory") of the autonomous driving vehicle, and further implement a better speed policy. In a trajectory planning process in the conventional technology, lane lines of a current lane and an adjacent lane are first obtained as virtual constraints, and then trajectory planning is performed within the constraints, to ensure that a vehicle travels without crossing a line. However, in the conventional technology, trajectory planning is performed only based on a lane line constraint, and a planning result is poor in robustness and cannot be adapted to a complex road condition and environment.

SUMMARY

This disclosure provides a trajectory planning method and apparatus, to plan a robust trajectory for an autonomous driving vehicle.

According to a first aspect, a trajectory planning method is provided and is applied to an autonomous driving vehicle, where the method includes:

receiving perception data, positioning data, and map information;

obtaining a preliminary traveling trajectory of the autonomous driving vehicle based on the perception data, the positioning data, and the map information, where the preliminary traveling trajectory includes N road points, each of the N road points includes first point information of the road point, the first point information includes coordinates of the road point and an allowable lateral error of the road point, the allowable lateral error indicates a lateral displacement error value allowed at the road point, and N is a positive integer greater than 1; and predicting a drivable speed of the autonomous driving vehicle at each of n road points of the N road points based on traffic road condition information, the perception data, and the preliminary traveling trajectory, to obtain a target traveling trajectory, where the target traveling trajectory includes the n road points, each of the n road points further includes second road point information of the road point, the second road point information includes a drivable speed of the autonomous driving vehicle at the road point, and n is a positive integer less than or equal to N.

Optionally, the traffic road condition information includes traffic signal light information, road speed limit information, lane change vacancy information, or obstacle information.

In the foregoing trajectory planning method provided in embodiments of this disclosure, the n road points included in the target traveling trajectory and drivable speeds included in the n road points are obtained based on the N road points included in the preliminary traveling trajectory. In other words, allowable lateral errors included in the N road points function in a longitudinal speed planning process. Therefore, in a trajectory planning process, information of lateral displacement planning is combined in longitudinal speed planning. In this way, the finally planned target traveling trajectory is obtained through joint planning of lateral displacement and a longitudinal speed. This design of the lateral-longitudinal joint planning brings higher safety precision of the planned target traveling trajectory, and makes autonomous driving more comfortable.

In a possible implementation, the obtaining a preliminary traveling trajectory of the autonomous driving vehicle based on the perception data, the positioning data, and the map information includes:

obtaining a reference trajectory based on the positioning data and the map information, where the reference trajectory includes $R_1$ reference road points and a width constraint, the $R_1$ reference road points are located on a center line of a lane in which the autonomous driving vehicle is currently located or on a deviation line of the center line, the width constraint is used for constraining, in an obstacle avoidance planning process, an offset of each reference road point from lateral displacement of a current location of the reference road point, and the deviation line is a line that deviates from a preset range of the center line;

performing obstacle avoidance planning on the reference trajectory based on the perception data, the $R_1$ reference road points, and the width constraint, and generating an obstacle avoidance trajectory, where the obstacle avoidance trajectory includes $R_2$ obstacle avoidance road points, and each of the $R_2$ obstacle avoidance road points includes coordinates of the obstacle avoidance road point; and determining, according to an allowable lateral error generation rule, an allowable lateral error corresponding to each of the $R_2$ obstacle avoidance road points, to obtain the preliminary traveling trajectory, where the N road points included in the preliminary traveling trajectory are the $R_2$ obstacle avoidance road points.

In the foregoing obstacle avoidance process, the obstacle avoidance road point is obtained by laterally shifting (a moving direction of the vehicle is used as a longitudinal direction, and a direction perpendicular to or approximately perpendicular to the longitudinal direction is used as a lateral direction) based on the reference road point, or is regenerated based on the reference road point and the width constraint. Therefore, a quantity of obstacle avoidance road points may be the same as or may be different from a quantity of reference road points. Therefore, a value relationship between $R_1$ and $R_2$ is not limited.

The obstacle avoidance trajectory obtained through the foregoing obstacle avoidance processing can avoid an obstacle that may be encountered in a process in which the vehicle moves forward. Therefore, basic safety assurance is obtained.

In a possible implementation, after the generating an obstacle avoidance trajectory, the method further includes: performing trajectory smoothing processing on the obstacle avoidance trajectory, and generating a smooth trajectory, where the smooth trajectory includes $R_3$ smooth road points, and each of the $R_3$ smooth road points includes coordinates of the smooth road point.

Correspondingly, the determining, according to an allowable lateral error generation rule, an allowable lateral error corresponding to each of the $R_2$ obstacle avoidance road points, to obtain the preliminary traveling trajectory includes:

determining, according to the allowable lateral error generation rule, an allowable lateral error corresponding to each of the $R_3$ smooth road points, to obtain the preliminary traveling trajectory, where the N road points included in the preliminary traveling trajectory are the $R_3$ smooth road points.

In the foregoing described smoothing process, because processing such as interpolation or sampling may be performed on the obstacle avoidance point in the smoothing process, that is, obstacle avoidance points are added or reduced in the smoothing process, a quantity of smooth road points may be the same as or different from the quantity of obstacle avoidance road points. Therefore, a value relationship between $R_2$ and $R_3$ is not limited either.

Not only a safety factor is considered for the smooth trajectory obtained through the foregoing smoothing processing, but also autonomous driving is more comfortable because the smooth trajectory is smoother.

In a possible implementation, the predicting a drivable speed of the autonomous driving vehicle at each of n road points of the N road points based on traffic road condition information, the perception data, and the preliminary traveling trajectory includes:

generating, based on the perception data, an ST diagram including an obstacle occupied area, where the ST diagram includes a T (time) axis and an S (displacement) axis, the ST diagram includes a law of relative displacement changing with time, and the relative displacement includes displacement of an obstacle relative to the autonomous driving vehicle; and determining, based on a preset algorithm and a speed upper limit, a location of a point $i_j$ the ST diagram, where j is successively selected from 1 to n, to generate an ST planning curve that avoids the obstacle occupied area, the ST planning curve includes n points from $i_1$ to $i_n$, the n points are in a one-to-one correspondence with the n road points, and an S/T value corresponding to each of the n points in the ST diagram is the drivable speed of the autonomous driving vehicle at each of the n road points, where the speed upper limit is used for constraining a value range of the drivable speed in a process of generating the ST planning curve, and the speed upper limit is obtained based on the traffic road condition information and the preliminary traveling trajectory.

Because the speed upper limit is obtained based on output information, namely, the preliminary traveling trajectory (including information such as an allowable lateral error of a road point) of the lateral displacement planning, the information of the lateral displacement planning is considered in a longitudinal speed planning process, to obtain a common output result, namely, the target traveling trajectory, which is a more robust trajectory, of the lateral planning and the longitudinal planning.

In a possible implementation, before the determining, based on a preset algorithm and a speed upper limit, a location of a point $i_j$ in the ST diagram, the method further includes: performing speed planning on each of the n road points based on the traffic road condition information, to obtain first speed constraints of the n road points;

obtaining, based on an allowable lateral error of each of then road points, second speed constraints, of then road points, corresponding to the allowable lateral errors of then road points; and determining that a speed constraint with a smallest value in a plurality of speed constraints included in each of the n road points is the speed upper limit, where the plurality of speed constraints include the first speed constraint and the second speed constraint.

It may be found that, in a process of determining the speed upper limit, the allowable lateral error is comprehensively considered. Therefore, the speed upper limit is a result of the lateral-longitudinal joint planning, and the result further functions on the speed planning and an allowable speed error. Finally, the target traveling trajectory of the lateral-longitudinal joint planning is obtained.

Table lookup is performed in a reverse lookup table to obtain second speeds that are in a one-to-one correspondence with preliminary road points.

The obtaining, based on an allowable lateral error of each of the n road points, second speed constraints, of the n road points, corresponding to the allowable lateral errors of the n road points may be implemented by using the reverse lookup table. The reverse lookup table includes a preset correspondence between an allowable lateral error and a speed constraint.

In a possible implementation, before the determining, based on a preset algorithm and a speed upper limit, a location of a point $i_j$ in the ST diagram, the method further includes:

calculating a curvature of each road point based on each of the n road points and x road points adjacent to the road point, where x is a positive integer greater than 0; and obtaining a third speed constraint of each road point based on the curvature of the road point and a maximum allowable lateral acceleration of the road point, where the plurality of speed constraints further includes the third speed constraint.

In a possible implementation, after the predicting a drivable speed of the autonomous driving vehicle at each of n road points of the N road points based on traffic road condition information, the perception data, and the preliminary traveling trajectory, the method further includes:

generating an allowable speed error of each of the n road points based on the ST diagram, the ST planning curve, and the speed upper limit, where the second road point information further includes the allowable speed error, and the allowable speed error is used for indicating a speed error allowed at each of the n road points.

In a possible implementation, the generating an allowable speed error of each of the n road points based on the ST diagram, the ST planning curve, and the speed upper limit includes:

separately generating, in the ST diagram, an upper checkpoint upward and a lower checkpoint downward along the S axis for a point $i_{j+1}$, where the upper checkpoint and the lower checkpoint are determined based on an allowable longitudinal displacement error of the point $i_{j+1}$, the allowable longitudinal displacement error is a displacement error allowed at the point $i_{j+1}$ along a positive or negative direction of the S axis in the ST diagram, the point $i_{j+1}$ is a point at a next moment of the point $i_j$, the point $i_j$ is any point in the n points other than a point $i_n$, and duration of one moment is preset duration; and connecting the point $i_j$ to the upper checkpoint to obtain a first slope, and connecting the point $i_j$ to the lower checkpoint to obtain a second slope, where the first slope and the second slope are used for indicating an allowable speed error of a road point corresponding to the point $i_j$.

According to a second aspect, a trajectory planning apparatus is provided and is applied to an autonomous driving vehicle. The trajectory planning apparatus includes a receiving module, a lateral displacement planning module, and a longitudinal speed planning module. The receiving module, the lateral displacement planning module, and the longitudinal speed planning module are configured to implement method steps corresponding to any one of the first aspect or a plurality of possible implementations of the first aspect.

According to a third aspect, a trajectory planning apparatus is provided, including an input/output interface, a processor, and a memory. The processor is configured to control the input/output interface to send and receive information. The memory is configured to store a computer program. The processor is configured to invoke the computer program from the memory and run the computer program. The processor is enabled to perform the method according to any one of the first aspect or the possible implementations of the first aspect.

Optionally, the processor may be a general-purpose processor, and may be implemented by using hardware or software. When the processor is implemented by hardware, the processor may be a logic circuit, an integrated circuit, or the like. When the processor is implemented by software, the processor may be a general-purpose processor, and is implemented by reading software code stored in the memory. The memory may be integrated into the processor, or may be located outside the processor and exist independently.

According to a fourth aspect, a computer program product is provided, where the computer program product includes computer program code. When the computer program code is run on a computer, the computer is enabled to perform the method according to the foregoing aspects.

According to a fifth aspect, a computer-readable medium is provided, where the computer-readable medium stores program code. When the computer program code is run on a computer, the computer is enabled to perform the method according to the foregoing aspects.

According to a sixth aspect, an autonomous driving vehicle is provided. The autonomous driving vehicle includes a planner and a controller. The planner is configured to perform trajectory planning according to the method according to any one of the first aspect or the possible implementations of the first aspect. The controller is configured to: perform vehicle control based on the target traveling trajectory obtained according to any one of the first aspect or the possible implementations of the first aspect, and output a control variable, where the control variable includes a throttle control value, a brake control value, and a steering wheel angle.

BRIEF DESCRIPTION OF DRAWINGS

The following briefly describes the accompanying drawings.

DESCRIPTION OF EMBODIMENTS

The following describes the technical solutions in embodiments of this disclosure with reference to the accompanying drawings. It is clear that the described embodiments are merely some but not all of embodiments of this disclosure. All other embodiments obtained by a person of ordinary skill in the art based on the disclosed embodiments without creative efforts shall fall within the protection scope of the claims.

Figure 1:
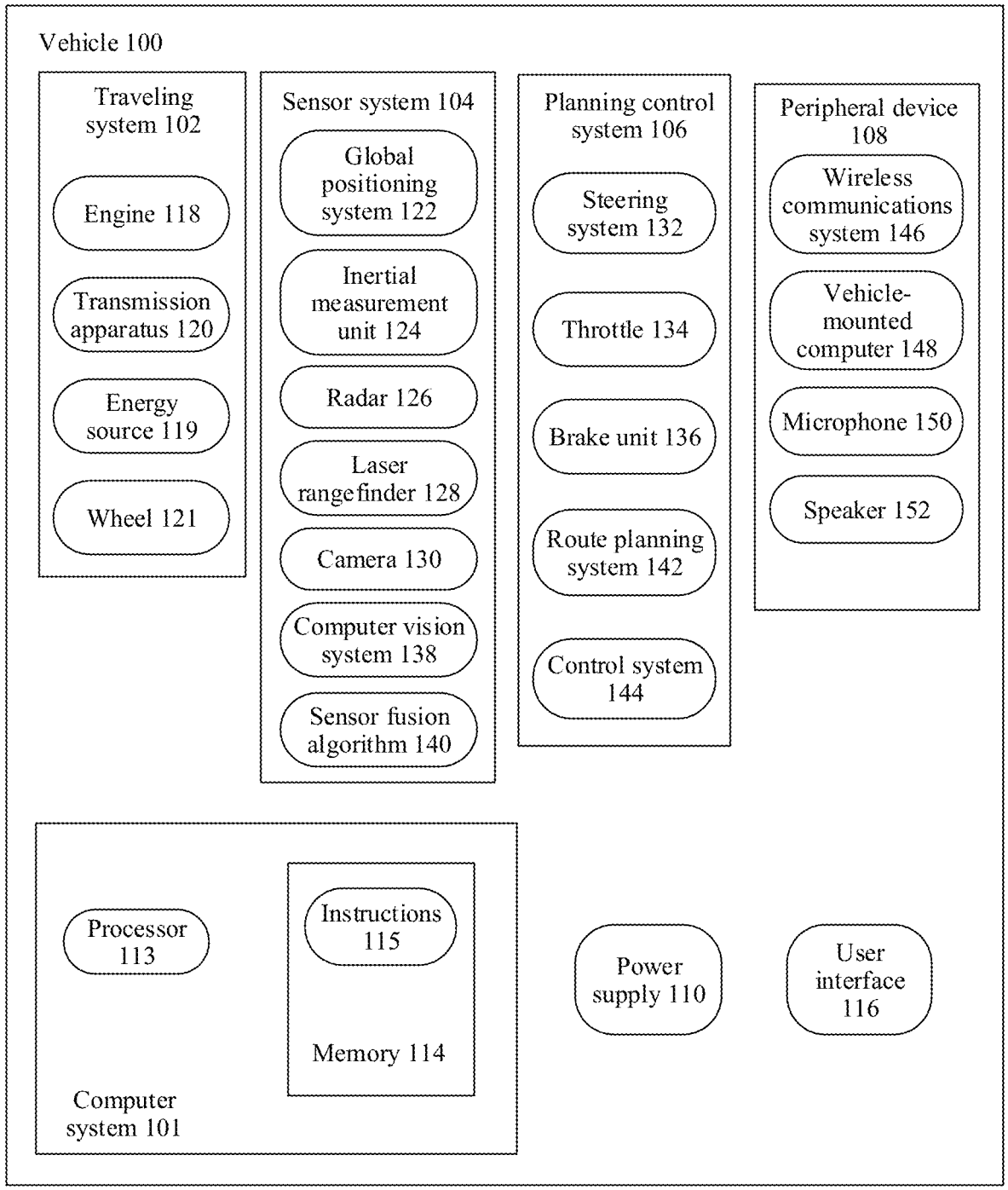
FIG. 1 is a schematic diagram of a structure of an autonomous driving vehicle according to an embodiment of this disclosure.

FIG. 1 is a functional block diagram of a vehicle 100 according to an embodiment of this disclosure. In an embodiment, the vehicle 100 is configured to be in a fully or partially autonomous driving mode. For example, the vehicle 100 in the autonomous driving mode may control the vehicle 100. A manual operation may be performed to determine current statuses of the vehicle and an ambient environment of the vehicle, determine possible behavior of at least one another vehicle in the ambient environment, determine a confidence level corresponding to a possibility that the another vehicle performs the possible behavior, and control the vehicle 100 based on the determined information. When the vehicle 100 is in the autonomous driving mode, the vehicle 100 may be set to operate without interacting with a person.

The vehicle 100 may include various subsystems, such as a traveling system 102, a sensor system 104, a planning control system 106, one or more peripheral devices 108, a power supply 110, a computer system 101, and a user interface 116. Optionally, the vehicle 100 may include more or fewer subsystems, and each subsystem may include a plurality of elements. In addition, each subsystem and element of the vehicle 100 may be interconnected in a wired or wireless manner.

The traveling system 102 may include a component that provides power for the vehicle 100. In an embodiment, the traveling system 102 may include an engine 118, an energy source 119, a transmission apparatus 120, and wheels 121. The engine 118 may be an internal combustion engine, an electric motor, an air compression engine, or one engine of another type or a combination of a plurality of engines. The combination of a plurality of engines herein may include, for example, a hybrid engine including a gasoline engine and an electric motor, and a hybrid engine including an internal combustion engine and an air compression engine. The engine 118 converts the energy source 119 into mechanical energy.

Examples of the energy source 119 include gasoline, diesel, other oil-based fuels, propane, other compressed gas-based fuels, ethanol, solar panels, batteries, and other power sources. The energy source 119 may also provide energy for another system of the vehicle 100.

The transmission apparatus 120 may transmit mechanical power from the engine 118 to the wheels 121. The transmission apparatus 120 may include a gearbox, a differential, and a drive shaft. In an embodiment, the transmission apparatus 120 may further include another component, for example, a clutch. The drive shaft may include one or more shafts that may be coupled to one or more wheels 121.

The sensor system 104 may include several sensors that sense information about the vehicle 100 and information about the ambient environment of the vehicle 100. For example, the sensor system 104 may include a positioning system 122 (the positioning system may be a GPS system, a BeiDou system, or another positioning system), an inertial measurement unit (IMU) 124, a radar 126, a laser rangefinder 128, a camera 130, a computer vision system 138, and a sensor fusion algorithm 140. The sensor system 104 may further include sensors (for example, an in-vehicle air quality monitor, a fuel gauge, an oil temperature gauge, and the like) of an internal system of the vehicle 100. One or more pieces of sensor data from the sensors may be used for detecting a to-be-detected object and corresponding features (a location, a shape, a direction, a speed, and the like) of the to-be-detected object. Such detection and recognition are key functions for implementing a secure operation of the vehicle 100.

The global positioning system 122 may be configured to estimate a geographical location of the vehicle 100. The IMU 124 is configured to sense location and orientation changes of the vehicle 100 based on an inertial acceleration. In an embodiment, the IMU 124 may be a combination of an accelerometer and a gyroscope.

The radar 126 may sense an object in the ambient environment of the vehicle 100 by using a radio signal. In some embodiments, in addition to sensing an object, the radar 126 may be further configured to sense a speed and/or a moving direction of the object.

The laser rangefinder 128 may sense, by using a laser, an object in an environment in which the vehicle 100 is located. In some embodiments, the laser rangefinder 128 may include one or more laser sources, a laser scanner, one or more detectors, and another system component.

The camera 130 may be configured to capture a plurality of images of the ambient environment of the vehicle 100. The camera 130 may be a static camera or a video camera.

The computer vision system 138 may operate to process and analyze the images captured by the camera 130, to recognize objects and/or features in the ambient environment of the vehicle 100. The objects and/or features may include traffic signals, road boundaries, and obstacles. The computer vision system 138 may use an object recognition algorithm, a structure from motion (SFM) algorithm, video tracking, and another computer vision technology. In some embodiments, the computer vision system 138 may be configured to: draw a map for an environment, track an object, estimate a speed of the object, and the like.

The planning control system 106 controls operations of the vehicle 100 and components of the vehicle 100. The planning control system 106 may include various elements, including a steering system 132, a throttle 134, a braking unit 136, a route planning system 142, and a control system 144.

A moving direction of the vehicle 100 may be adjusted by operating the steering system 132. For example, in an embodiment, the steering system 132 may be a steering wheel system.

The throttle 134 is configured to: control an operating speed of the engine 118 and further control a speed of the vehicle 100.

The braking unit 136 is configured to control the vehicle 100 to decelerate. The braking unit 136 may use friction to slow down the wheels 121. In another embodiment, the braking unit 136 may convert kinetic energy of the wheel 121 into a current. Alternatively, the braking unit 136 may reduce a rotational speed of the wheel 121 in another form to control the speed of the vehicle 100.

The route planning system 142 is configured to determine a traveling route of the vehicle 100. In some embodiments, the route planning system 142 may plan, for the vehicle 100 with reference to data from the computer vision system 138, the GPS 122, and one or more predetermined maps, a traveling route that can avoid a potential obstacle in the environment. A trajectory planning method provided in embodiments of this application may be performed by the route planning system 142 to output a target traveling trajectory for the vehicle 100. The target traveling trajectory includes a plurality of target road points. Each of the plurality of target road points includes coordinates of the road point, and an allowable lateral error and an allowable speed error of the road point. The allowable lateral error described in this specification includes a value range of the allowable lateral error, and may be understood as a short name of the value range of the allowable lateral error in some cases. A lateral direction herein refers to a direction perpendicular to or approximately perpendicular to a moving direction of the vehicle. Essentially, the allowable lateral error means an allowable lateral displacement error, namely, a value range of an allowable displacement error of the vehicle 100 in the direction perpendicular to or approximately perpendicular to the moving direction of the vehicle. Details are not described below.

The control system 144 is configured to generate control values of the throttle, a brake, and a steering angle based on the traveling route/traveling trajectory output by the route planning system, to control the steering system 132, the throttle 134, and the braking unit 136.

Certainly, in an example, in the planning control system 106, components other than those shown and described may be added or alternatively included. Alternatively, the planning control system 106 may not include some of the foregoing components.

The vehicle 100 interacts with an external sensor, another vehicle, another computer system, or a user by using the peripheral device 108. The peripheral device 108 may include a wireless communications system 146, a vehicle-mounted computer 148, a microphone 150, and/or a speaker 152.

In some embodiments, the peripheral device 108 provides a means for a user of the vehicle 100 to interact with the user interface 116. For example, the vehicle-mounted computer 148 may provide information for the user of the vehicle 100. The user interface 116 may further operate the vehicle-mounted computer 148 to receive user input. In an implementation, the vehicle-mounted computer 148 may perform an operation by using a touchscreen. In another case, the peripheral device 108 may provide a means for the vehicle 100 to communicate with another device located in the vehicle. For example, the microphone 150 may receive audio (for example, a voice command or other audio input) from the user of the vehicle 100. Similarly, the speaker 152 may output audio to the user of the vehicle 100.

The wireless communications system 146 may communicate with one or more devices directly or through a communications network. For example, the wireless communications system 146 may perform communication through a 3G cellular network such as CDMA, EVD0, or GSM/GPRS, perform communication through a 4G cellular network such as LTE, or perform communication through a 5G cellular network. The wireless communications system 146 may communicate with a wireless local area network (WLAN) by using Wi-Fi. In some embodiments, the wireless communications system 146 may directly communicate with a device through an infrared link, Bluetooth, or ZigBee. Other wireless protocols, for example, various vehicle communications systems, such as the wireless communications system 146, may include one or more dedicated short-range communications (DSRC) devices, and these devices may include public and/or private data communication between the vehicle and/or roadside stations.

The power supply 110 may supply power to various components of the vehicle 100. In an embodiment, the power supply 110 may be a rechargeable lithium-ion or lead-acid battery. One or more battery packs of such a battery may be configured as the power supply, to supply power to various components of the vehicle 100. In some embodiments, for example, in an all-electric vehicle, the power supply 110 and the energy source 119 may be implemented together.

Some or all functions of the vehicle 100 are controlled by the computer system 101. The computer system 101 may include at least one processor 113. The processor 113 executes instructions 115 stored in a non-transitory computer-readable medium such as a memory 114. The computer system 101 may alternatively be a plurality of computing devices that control individual components or subsystems of the vehicle 100 in a distributed manner.

The processor 113 may be any conventional processor, for example, a commercially available CPU. Alternatively, the processor may be a dedicated device such as an ASIC or another hardware-based processor. Although FIG. 1 functionally shows the processor, the memory, and another element of the computer system 101, a person of ordinary skill in the art should understand that the processor and the memory may actually include a plurality of other processors or memories that are not located in a same physical housing. For example, the memory may be a hard disk drive or another storage medium located in a housing different from a housing of the computer system 101. Therefore, a reference to the processor is understood as an inclusion of a reference to a set of processors or memories that may or may not operate in parallel. Different from a case in which a single processor is used to perform steps described herein, for example, each of some components of a steering component and a deceleration component may have its own processor, and the processor performs only computation related to a function specific to the component. Alternatively, subsystems such as the traveling system, the sensor system, and the planning control system may have their own processors, configured to implement computation of a related task of a corresponding subsystem to implement a corresponding function.

In aspects described herein, the processor may be located far away from the vehicle, and wirelessly communicate with the vehicle. In another aspect, some of the processes described herein are performed by a processor disposed inside the vehicle. Another process, including taking a necessary step to perform a single operation, is performed by a remote processor.

In some embodiments, the memory 114 may include the instructions 115 (for example, program logic), and the instructions 115 may be executed by the processor 113 to perform various functions of the vehicle 100, including the functions described above. The memory 114 may also include additional instructions, including instructions used to send data to, receive data from, interact with, and/or control one or more of the traveling system 102, the sensor system 104, the planning control system 106, and the peripheral device 108.

In addition to the instructions 115, the memory 114 may further store other related data, for example, a road map, route information, and a location, a direction, a speed, and other related information of the vehicle. Such information may be used by the vehicle 100 or specifically by the computer system 101 during operation of the vehicle 100 in an autonomous, semi-autonomous, and/or manual mode.

The user interface 116 is configured to provide information for or receive information from the user of the vehicle 100. Optionally, the user interface 116 may include one or more input/output devices within a set of peripheral devices 108, such as the wireless communications system 146, the vehicle-mounted computer 148, the microphone 150, and the speaker 152.

The computer system 101 may control functions of the vehicle 100 based on input received from various subsystems (such as the traveling system 102, the sensor system 104, and the planning control system 106) and from the user interface 116. In some embodiments, the computer system 101 is operable to control a plurality of aspects of the vehicle 100 and the subsystems of the vehicle 100.

Optionally, one or more of the foregoing components may be installed separately from or associated with the vehicle 100. For example, the memory 114 may be partially or completely separated from the vehicle 100. The foregoing components may be communicatively coupled together in a wired and/or wireless manner.

Optionally, the foregoing components are merely examples. In actual application, components in the foregoing modules may be added or removed based on an actual requirement. FIG. 1 should not be construed as a limitation on embodiments of this application.

An autonomous driving vehicle, for example, the foregoing vehicle 100, traveling on a road, may recognize an object in an ambient environment of the autonomous driving vehicle to determine adjustment on a traveling trajectory of the vehicle, including adjustment on a speed of the vehicle. The object may be another vehicle, a traffic control device, or an object of another type. In some examples, each recognized object may be considered independently, and trajectory planning, including a to-be-adjusted speed, of the autonomous driving vehicle is determined based on respective features of the object, for example, a current speed, an acceleration, and a distance between the object and the vehicle.

Optionally, a computing device (for example, the computer system 101 and the computer vision system 138 in FIG. 1) associated with the autonomous driving vehicle 100 may predict behavior of the recognized object based on the features of the recognized object and a state of an ambient environment (for example, traffic, rain, ice on a road, and the like). Optionally, all recognized objects depend on behavior of each other, and therefore, all the recognized objects may be considered together to predict behavior of a single recognized object. The vehicle 100 can plan a traveling trajectory (including the speed) of the vehicle 100 based on the predicted behavior of the recognized object. A state (for example, acceleration, deceleration, or stop in terms of speed adjustment) to which the vehicle needs to be adjusted is determined for the autonomous driving vehicle based on a planning result. In this process, another factor, for example, a lateral location that is of the vehicle 100 and that is on the road on which the vehicle 100 travels, curvature of the road, and proximity of static and dynamic objects, may also be considered to determine the traveling trajectory of the vehicle 100.

Based on the planning result, in addition to adjusting the speed for the autonomous driving vehicle, the computing device may further provide an instruction for modifying the steering angle of the vehicle 100, so that the autonomous driving vehicle follows a given trajectory and/or maintains a safe lateral distance and a safe longitudinal distance from an object (for example, a vehicle in an adjacent lane on the road) near the autonomous driving vehicle.

The vehicle 100 may be a car, a truck, a motorcycle, a bus, a boat, an airplane, a helicopter, a lawn mower, a recreational vehicle, a playground vehicle, a construction device, a trolley, a golf cart, a train, a handcart, or the like. This is not specifically limited in this embodiment of this application.

Figure 2:
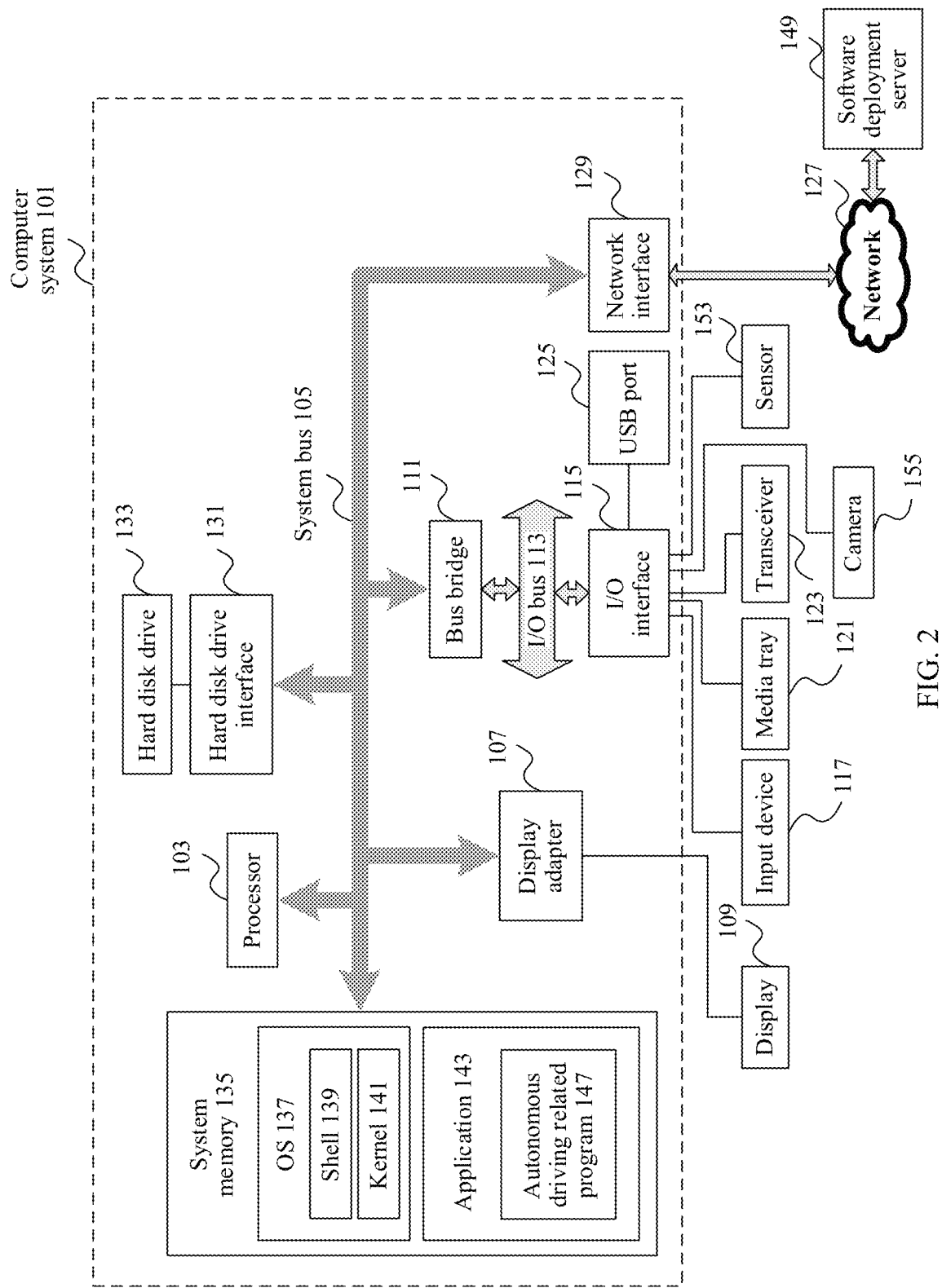
FIG. 2 is a schematic diagram of a structure of a computer system according to an embodiment of this disclosure.

According to FIG. 2, the computer system 101 may include a processor 103, a system bus 105, a display adapter (video adapter) 107, a display 109, a bus bridge 111, an input/output bus (I/O bus) 113, an I/O interface 115, a USB port 125, a network interface 129, a hard disk drive interface 131, a hard disk drive 133, and a system memory 135.

The processor 103 is coupled to the system bus 105. The processor 103 may be one or more processors, and each processor may include one or more processor cores. The display adapter may drive the display 109, and the display 109 is coupled to the system bus 105. The system bus 105 is coupled to the input/output bus (I/O bus) 113 by using the bus bridge 111. The I/O interface 115 is coupled to the I/O bus 113. The I/O interface 115 communicates with a plurality of I/O devices. The plurality of I/O devices include an input device 117 (including examples such as a keyboard, a mouse, and a touchscreen), a media tray 121 (for example, a CD-ROM, a multimedia interface, and the like), a transceiver 123 (which may send and/or receive a radio communications signal), a camera 155 (which may capture static and dynamic digital video and images), and a USB port 125. Optionally, an interface connected to the I/O interface 115 may be the USB port 125.

The processor 103 may be any conventional processor, including a reduced instruction set computing ("RISC") processor, a complex instruction set computing ("CISC") processor, or a combination thereof. Optionally, the processor may be a dedicated apparatus such as an application-specific integrated circuit ("ASIC"). Optionally, the processor 103 may be a neural network processor or a combination of the neural network processor and the foregoing conventional processor.

Optionally, in various embodiments described herein, the computer system 101 may be located far away from the autonomous driving vehicle and may wirelessly communicate with the autonomous driving vehicle 100. In some implementations, some of the processes described herein may also be performed by a processor disposed inside the autonomous driving vehicle. Another process, including taking an action required to perform a single operation, is performed by a remote processor.

The computer system 101 may communicate with a software deployment server 149 through a network interface 129. The network interface 129 includes a hardware network interface, for example, a network interface card. A network 127 may be an external network, for example, the Internet; or may be an internal network, for example, the Ethernet or a virtual private network (VPN). Optionally, the network 127 may alternatively be a wireless network, for example, a Wi-Fi network, a cellular network, or the like.

The hard disk drive interface 131 is coupled to the system bus 105. The hard disk drive interface 131 is connected to the hard disk drive 133. The system memory 135 is coupled to the system bus 105. Data running in the system memory 135 may include an operating system 137 and an application 143 of the computer system 101.

The operating system OS 137 includes a shell 139 and a kernel 141. The shell 139 is an interface between a user and the operating system. The shell 139 is an outermost layer of the operating system. The shell 139 may be configured to manage interaction between the user and the operating system: waiting for input of the user, explaining the input of the user to the operating system, and processing various output results of the operating system.

The kernel 141 includes components of the operating system that are configured to manage a memory, a file, a peripheral, and system resources. The kernel 141 directly interacts with hardware. The kernel of the operating system usually runs processes, provides communication between processes, and provides CPU time slice management, interruption management, memory management, and I/O management.

The application 143 includes a program for controlling autonomous driving of the vehicle, for example, a program for managing interaction between the autonomous driving vehicle and an obstacle on the road, a program for controlling the autonomous driving vehicle to travel along a planned trajectory (including a speed), and a program for controlling interaction between the autonomous driving vehicle and another autonomous driving vehicle on the road. The application 143 also exists on a system of the software deployment server 149. In an embodiment, when the application 143 needs to be executed, the computer system 101 may download the application 143 from the software deployment server 149.

A sensor 153 is associated with the computer system 101. The sensor 153 is configured to detect an ambient environment of the computer system 101. For example, the sensor 153 may detect an animal, a vehicle, an obstacle, a crosswalk, and the like. Further, the sensor may detect ambient environments of objects such as the animal, the vehicle, the obstacle, and the crosswalk, for example, the ambient environment of the animal: another object appearing around the animal, a weather condition, and brightness of the ambient environment. Optionally, if the computer system 101 is located on an autonomous driving car, the sensor may be a camera, an infrared sensor, a chemical detector, a microphone, or the like.

Figure 3:
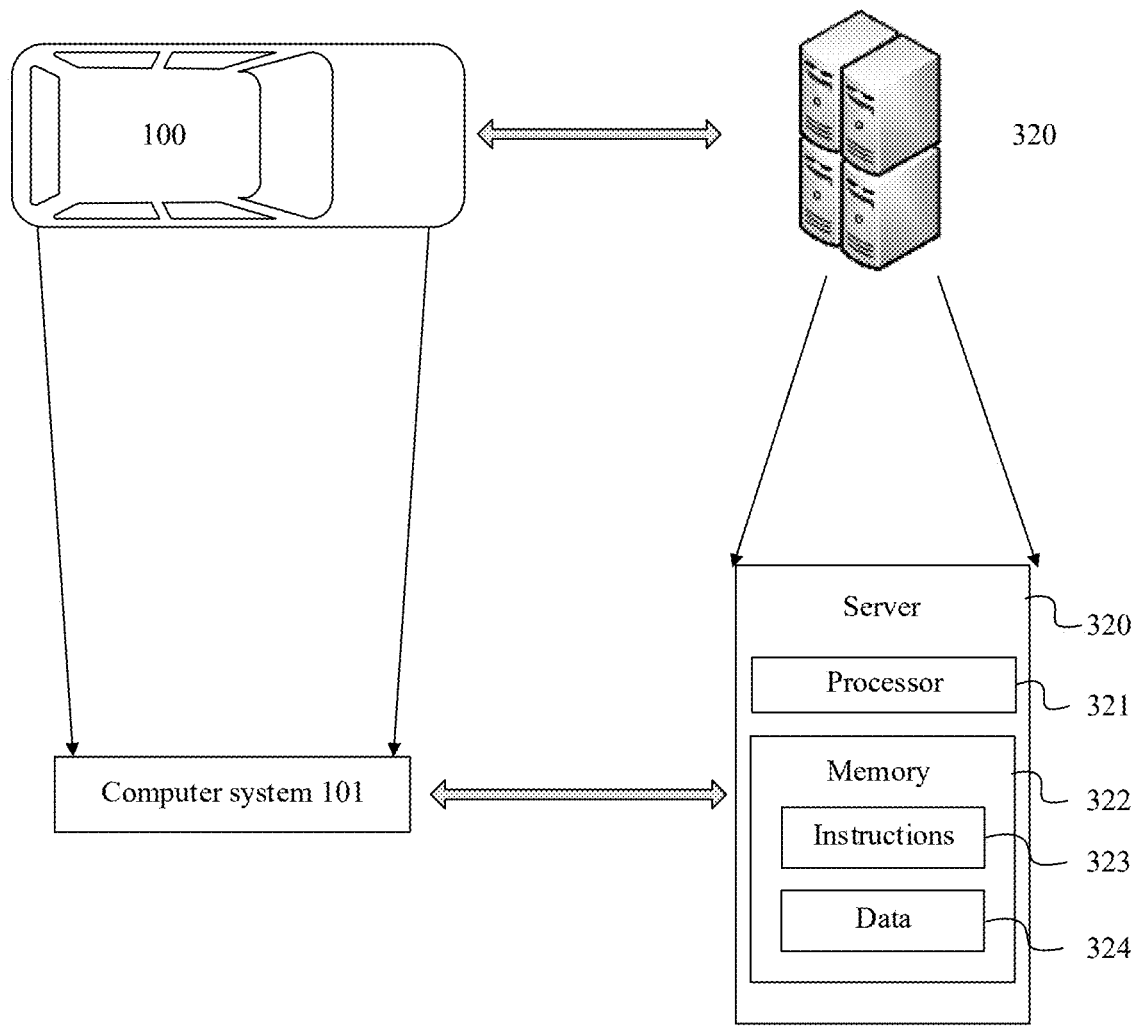
FIG. 3 is a schematic diagram of an application in which a cloud side instructs an autonomous driving vehicle according to an embodiment of this disclosure.

The computer system 101 may further receive information from another computer system, or transfer information to another computer system. Alternatively, sensor data collected from the sensor system 104 of the vehicle 100 may be transferred to another computer system for processing. As shown in FIG. 3, data from the computer system 101 may be transmitted by using a network to a computer 320 on a cloud side for further processing. The network and an intermediate node may include various configurations and protocols, including the Internet, the World Wide Web, an intranet, a virtual private network, a wide area network, a local area network, a private network using one or more company-specific communications protocols, the Ethernet, Wi-Fi, and the HTTP, and various combinations thereof. Such communication may be performed by any device that can transmit data to and from other computers, such as a modem or a wireless interface.

In one example, the computer 320 may include a server having a plurality of computers, such as a load balancing server cluster, which exchanges information with different nodes of the network for a purpose of receiving data from the computer system 101, processing the data, and transmitting the data. The server may be configured similar to the computer system 101, and has a processor 321, a memory 322, instructions 323, and data 324.

Figure 4:
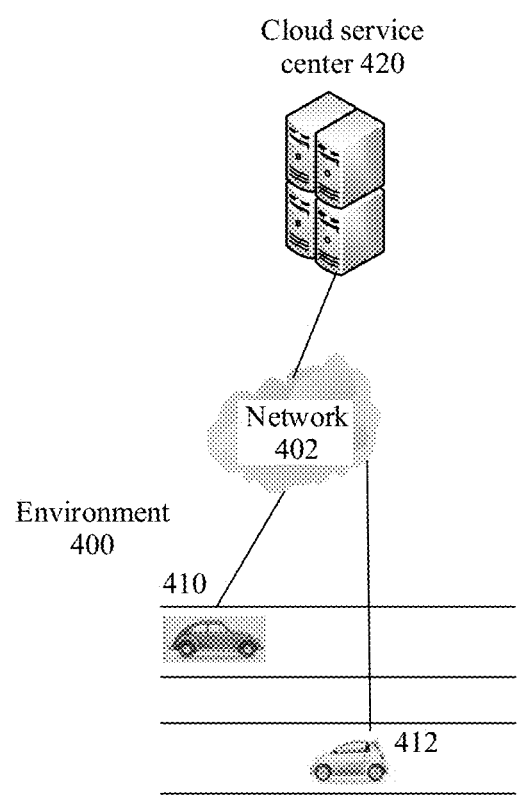
FIG. 4 is a schematic diagram of an application in which a cloud side instructs an autonomous driving vehicle according to an embodiment of this disclosure.

FIG. 4 illustrates an example of interaction between an autonomous driving vehicle and a cloud service center 420 by using a network according to an example embodiment. The cloud service center 420 may receive information (for example, data or other information collected by a vehicle sensor) from autonomous driving vehicles 410 and 412 in an environment 400 by using the network 402 such as a wireless communications network, or deliver related information to the autonomous driving vehicles 410 and 412.

The cloud service center 420 may deliver data to any autonomous driving vehicle in the environment 400 based on global data stored or received by the cloud service center 420. For example, when the autonomous driving vehicle 410 needs to perform global path planning, the autonomous driving vehicle 410 may request global road condition information from the cloud service center 420, and the cloud service center 420 may deliver, to the autonomous driving vehicle 410 based on the request of the autonomous driving vehicle 410, the global road condition information related to the autonomous driving vehicle 410.

The network 402 may provide map information to the autonomous driving vehicles 410 and 412. In some examples, the cloud service center 420 may further forward related information and/or sensor data between autonomous driving vehicles.

In some examples, the cloud service center 420 sends, to the autonomous driving vehicle, a recommended solution regarding a possible driving situation in the environment (for example, informing the autonomous driving vehicle of a forward obstacle and telling the autonomous driving vehicle how to bypass the obstacle). For example, the cloud service center may assist the vehicle in determining how to travel when facing a specific obstacle in the environment. The cloud service center sends a response indicating how the vehicle should travel in a given scenario to the autonomous driving vehicle. For example, the cloud service center may determine, based on collected sensor data of a construction vehicle or another vehicle around the construction vehicle, that there is a "lane closed" sign on a lane, and determine that the lane is closed due to construction. Correspondingly, the cloud service center sends a recommended operation mode for the autonomous driving vehicle to pass through the obstacle (for example, indicating the vehicle to change to another road). When observing a video stream in an operating environment of the cloud service center and having confirmed that the autonomous driving vehicle can safely and successfully pass through the obstacle, the cloud service center may add, to a driving information map, operation steps that may be used by the autonomous driving vehicle. Correspondingly, this information may be sent to another vehicle that may encounter the same obstacle in an area, to assist another vehicle not only in recognizing the closed lane but also in knowing how to pass the closed lane.

Figure 5:
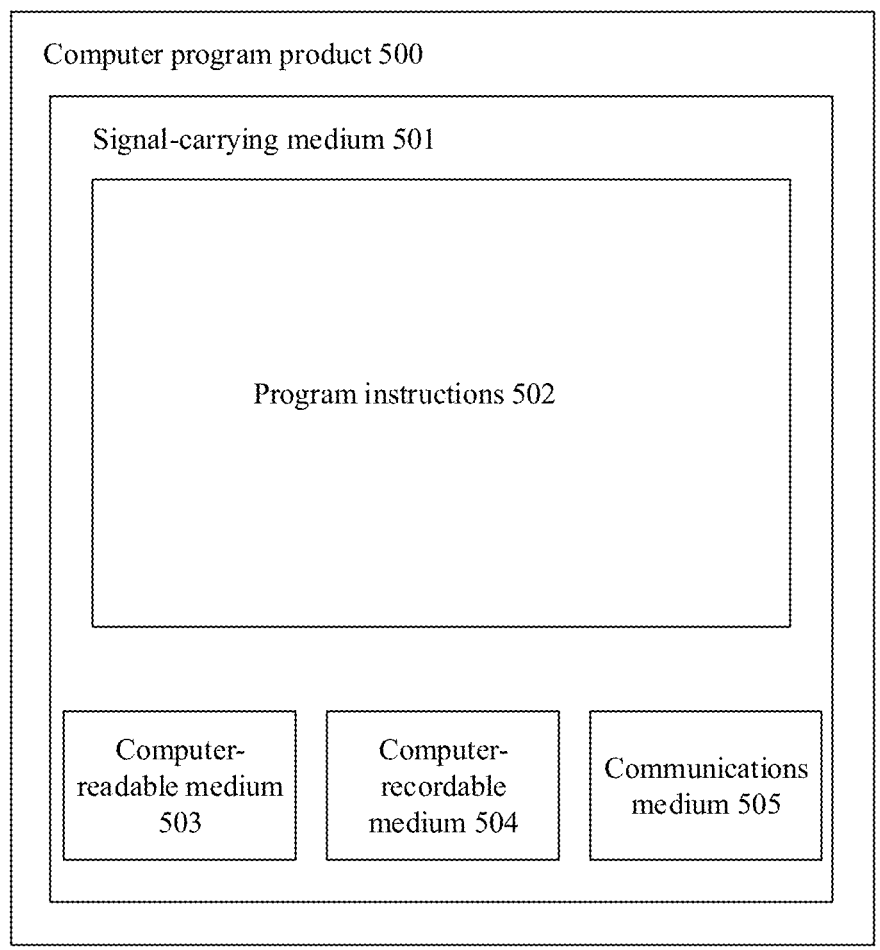
FIG. 5 is a schematic diagram of a computer program product according to an embodiment of this disclosure.

In some embodiments, the disclosed method may be implemented as computer program instructions encoded in a machine-readable format on a computer-readable storage medium or encoded on another non-transitory medium or product. FIG. 5 schematically shows a conceptual partial view of an example computer program product that includes a computer program for executing a computer process on a computing device and that is arranged according to at least some of embodiments shown herein. In an embodiment, the example computer program product 500 is provided using a signal-carrying medium 501. The signal-carrying medium 501 may include one or more program instructions 502. When the program instructions 502 are run by one or more processors, functions or some functions described in FIG. 6 may be provided. In addition, the program instructions 502 in FIG. 5 also describe example instructions.

In some examples, the signal-carrying medium 501 may include a computer-readable medium 503, such as but not limited to a hard disk drive, a compact disc (CD), a digital video disc (DVD), a digital tape, a memory, a read-only memory (ROM), or a random-access memory (RAM). In some implementations, the signal-carrying medium 501 may include a computer-recordable medium 504, such as but not limited to a memory, a read/write (R/W) CD, and an R/W DVD. In some implementations, the signal-carrying medium 501 may include a communications medium 505, such as but not limited to a digital and/or analog communications medium (for example, an optical fiber cable, a waveguide, a wired communications link, or a wireless communications link). Therefore, for example, the signal-carrying medium 501 may be conveyed by using the communications medium 505 (for example, a wireless communications medium that complies with the IEEE 802.11 standard or another transmission protocol) in a wireless form. The one or more program instructions 502 may be, for example, computer-executable instructions or logic implementation instructions. In some examples, the computer system described in FIG. 1 to FIG. 3 may be configured to provide various operations, functions, or actions in response to the program instructions 502 that are transmitted to the computing device by using one or more of the computer-readable medium 503, the computer-recordable medium 504, and/or the communications medium 505. It should be understood that the arrangement described herein is merely used as an example. Therefore, a person skilled in the art understands that other arrangements or other elements (for example, a machine, an interface, a function, a sequence, and a function group) can be used instead, and that some elements may be omitted based on an expected result. In addition, a plurality of the described elements are functional entities that can be implemented as discrete or distributed components, or implemented in any suitable combination at any suitable location in combination with another component. The following describes a trajectory planning method and apparatus provided in embodiments of this application.

A planning control module of autonomous driving includes a three-layer structure: high-level decision-making, path planning (also referred to as trajectory planning), and bottom-layer control. This is similar to an attended driving technology. An example in which a right lane is to be changed to is used. A human driver needs to make the following decisions: (1) determining lane change time by considering safety factors and traffic rules; (2) planning a traveling trajectory for a vehicle; and (3) controlling a throttle, a brake, and a steering wheel to enable the vehicle to travel along a predetermined trajectory. The three steps correspond to a behavior planner a motion planner, and a controller in the planning control module of the autonomous driving. The behavior planner is responsible for delivering a high-level decision, for example, changing a lane or keeping a lane. The motion planner is responsible for planning and predicting a trajectory and a speed. The controller is responsible for operating the throttle, the brake, and the steering wheel, so that an autonomous driving vehicle tracks a target trajectory and reaches a target speed. Embodiments provided in this application mainly focus on the motion planner, and the trajectory planning method provided in this application is performed by the motion planner.

In the autonomous driving field, a planning control module of an autonomous driving system is responsible for sensing an entire environment and outputting control instructions, and is an egress of the entire system. However, in a complex scenario, there is a problem of how to cover more scenarios by using a set of planning solutions, so that the planning control module can better plan a path based on different scenarios, to implement a better speed policy. In terms of control, there is a problem of how to balance lateral and longitudinal control precision to achieve a balance between control precision, a response speed, energy consumption, and comfort. These are problems that the motion planner needs to resolve.

For example, the vehicle passes through a width-limited door. When the vehicle quickly passes through the width-limited door, although no longitudinal collision occurs, there is a risk of a lateral collision if a longitudinal control deviation is large. Therefore, when the lateral and longitudinal control precision cannot be well balanced, the predicted trajectory and the predicted speed that are planned by the motion planner do not conform to driving logic, and safety is poor.

This problem is a key problem that needs to be faced by L4 and L5 autonomous driving. Therefore, an intelligence degree of an autonomous driving vehicle is greatly improved by resolving this problem to implement a balance between lateral planning control and longitudinal planning control, so that intelligent driving conforms to the driving logic and safety is improved.

Figure 6:
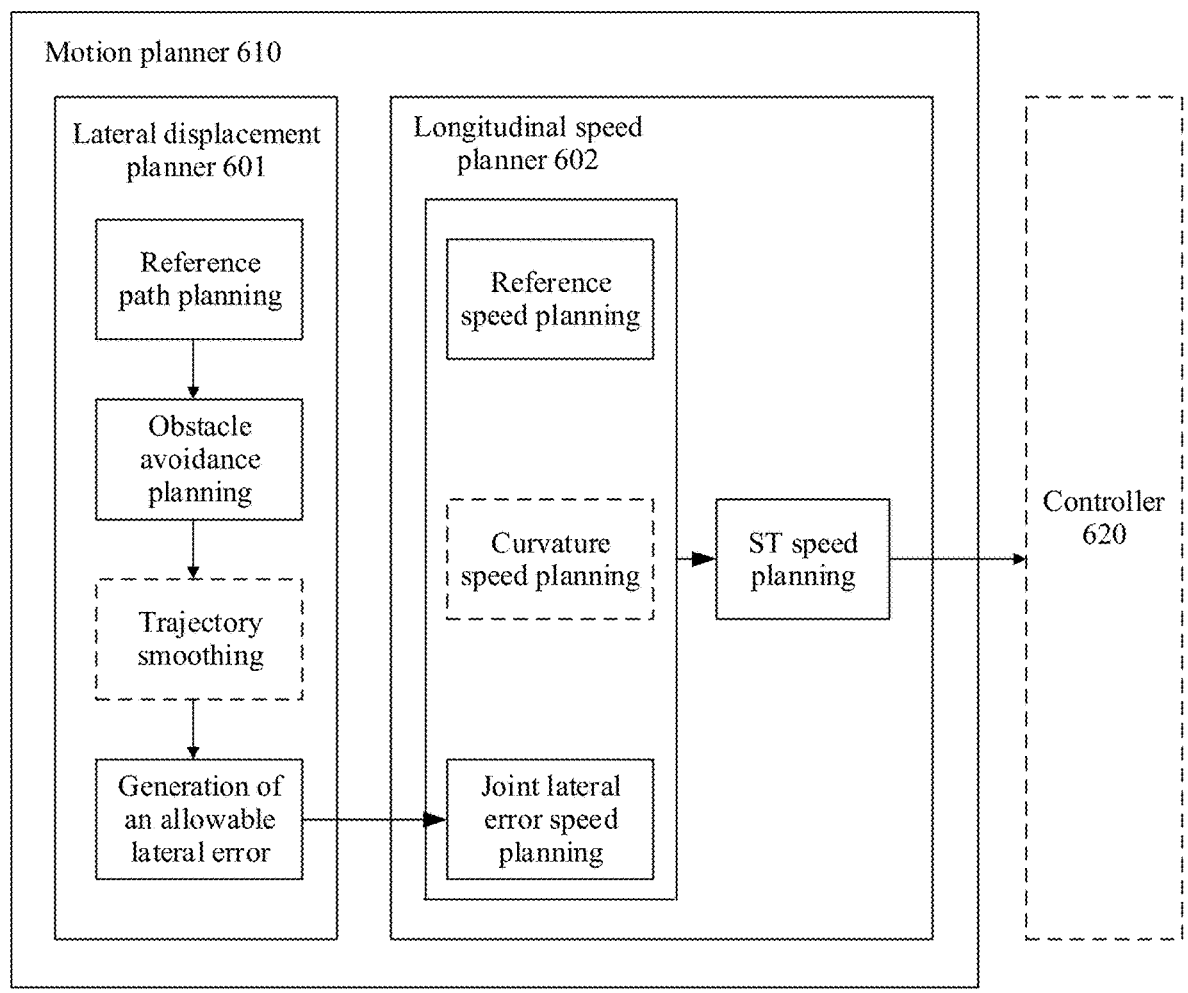
FIG. 6 is a schematic diagram of a structure of a motion planner according to an embodiment of this disclosure.

As shown in FIG. 6, the following describes a motion planner 610. The trajectory planning method provided in embodiments of this application is implemented by the motion planner 610. The motion planner 610 may be a part of the route planning system 142 in FIG. 1, and is configured to plan a traveling trajectory for the vehicle 100. The traveling trajectory is further output to a controller 620.

The motion planner 610 includes a lateral displacement planner 601 and a longitudinal speed planner 602. Division into the lateral displacement planner 601 and the longitudinal speed planner 602 may be logically performed based on functions, or the lateral displacement planner 601 and the longitudinal speed planner 602 may be different functional modules or hardware structures.

A high-definition map and status information of an autonomous driving vehicle are input into a system 600. The lateral displacement planner 601 is responsible for outputting a preliminary traveling trajectory with an allowable lateral error to the longitudinal speed planner 602 and the controller 620. The longitudinal speed planner 602 is responsible for outputting a target speed to the controller 620. Optionally, the longitudinal speed planner 602 may further output a target speed with an allowable speed error to the controller 620, where the target speed indicates a drivable speed of the autonomous driving vehicle. The controller 620 is responsible for outputting a throttle or brake amount, a steering wheel rotation angle, and the like.

Figure 7:
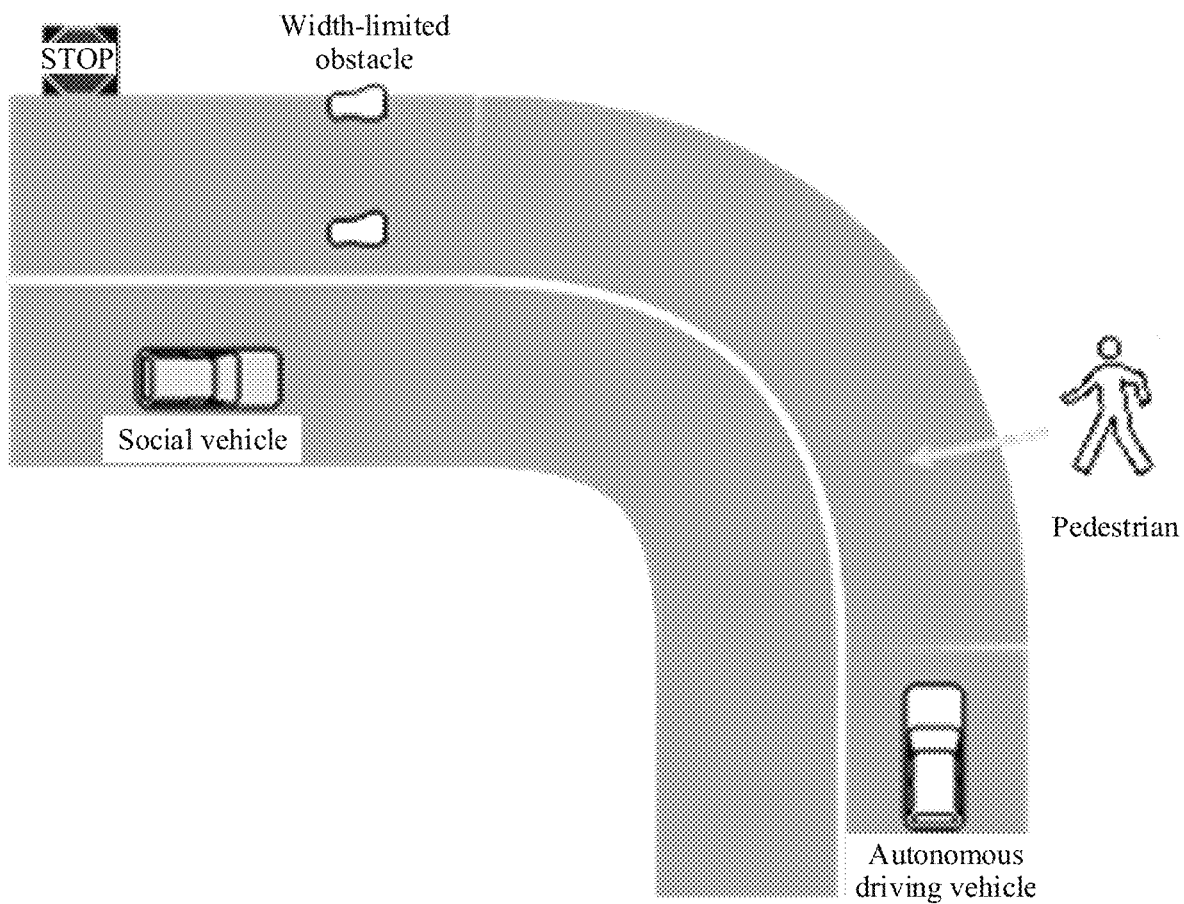
FIG. 7 is a schematic diagram of an autonomous driving vehicle traveling on an urban open structured road according to an embodiment of this disclosure.

FIG. 7 is used as an example. An autonomous driving vehicle 700 travels on an urban open structured road, there is a moving object around the autonomous driving vehicle 700, and the autonomous driving vehicle 700 is in a corresponding lane. A size, a speed, a prediction of a current pose, and a prediction of a future pose of the moving object around the autonomous driving vehicle 700 are all known. The autonomous driving vehicle 700 includes the planning control system 600. As shown in FIG. 7, the autonomous driving vehicle 700 goes straight through a section of the structured road. A road point and a road width are known. There is a width-limited obstacle in the lane, there is an obstacle (a pedestrian) that is outside the lane and that is about to intrude, and there is a stop sign in front of a curve. The autonomous driving vehicle 700 performs a task of complying with traffic rules and safely and stably passing through the road section. In Embodiment 1 described below, the scenario in FIG. 7 is used as an example, and it is assumed that a high-level decision delivered by a behavior planner to the autonomous driving vehicle is to keep a lane.

Embodiment 1

In the motion planner 610 shown in FIG. 6, the lateral displacement planner 601 uses a reference trajectory as a reference and performs obstacle avoidance planning within a limitation of the road width to generate a trajectory that can avoid all obstacles in the lane, which is referred to as an obstacle avoidance trajectory. Optionally, smoothing processing may be further performed on the obstacle avoidance trajectory to obtain a smooth trajectory, to generate an allowable lateral error for the smooth trajectory to obtain a preliminary traveling trajectory. Each road point on the preliminary traveling trajectory includes coordinates of the road point and at least one allowable lateral error.

The preliminary traveling trajectory is further input into the longitudinal speed planner 602. The longitudinal speed planner 602 plans a speed upper limit at each road point, namely, a maximum allowable speed of the autonomous driving vehicle at the road point, based on the coordinates of the road point on the preliminary traveling trajectory, the allowable lateral error included in the road point, and traffic road condition information. The process may specifically include the following three branches. As shown in the figure, the three branches include: reference speed planning, curvature speed planning, and joint lateral error speed planning. The curvature speed planning is an optional step.

The reference speed planning includes: planning a first speed constraint of each road point according to traffic rules such as traffic lights, a stop sign, and a speed limit. The curvature speed planning includes: planning a third speed constraint of each road point based on a road curvature and a centripetal acceleration limit. The joint lateral error speed planning includes: planning a second speed constraint of each of n road points in N road points on the preliminary traveling trajectory based on allowable lateral errors of then road points.

A speed constraint with a smallest value in the foregoing three speed constraints is output to a next step as the speed upper limit, and ST speed planning is performed to obtain an allowable longitudinal speed error of each of the n road points, to obtain a target traveling trajectory. The target traveling trajectory includes the n road points, and each of the n road points includes coordinates (coordinates in a global coordinate system) of the road point and the allowable lateral error of the road point, and a drivable speed and an allowable speed error of the autonomous driving vehicle at the road point, where the allowable speed error is an allowable speed error value.

Based on the foregoing solution provided in Embodiment 1 of this application, the target traveling trajectory may be further output to the controller 620, so that the controller 620 controls a throttle or brake amount, a steering wheel rotation angle, and the like based on the input.

Embodiment 2

In this embodiment, Embodiment 1 is further described in detail. In this embodiment of this application, it is still assumed that the high-level decision delivered by the behavior planner to the autonomous driving vehicle is to keep a lane. This is a basis for describing trajectory planning work in Embodiment 2.

Figure 8:
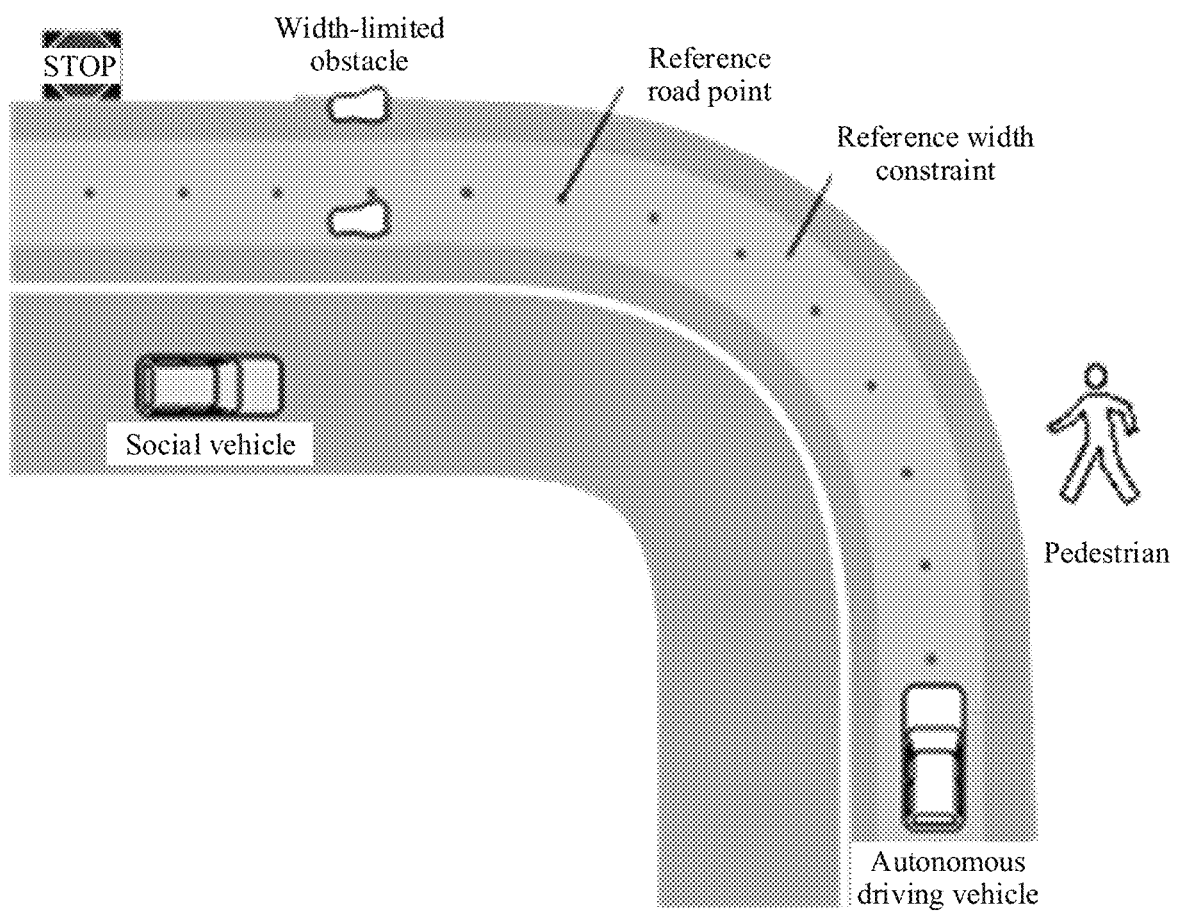
FIG. 8 is a schematic diagram of a lateral displacement planning process according to an embodiment of this disclosure.

As shown in FIG. 8, work of the lateral displacement planner 601 is first described.

Because a requirement of the autonomous driving vehicle is to keep a lane, the lateral displacement planner 601 uses a dashed line formed by connecting road points of the reference trajectory as a lane center line, and a left-right width constraint of each road point may be a distance between the lane center line and a lane borderline minus a half vehicle width, to ensure that the autonomous driving vehicle does not cross two side borderlines of the current lane.

The lateral displacement planner 601 obtains information about a current traveling lane of the autonomous driving vehicle based on positioning and high-definition map information, and uses, as the reference trajectory, a trajectory formed by a center line of the current traveling lane of the autonomous driving vehicle or a deviation line in a preset range of the center line. The reference trajectory includes a plurality of reference road points and a width constraint. The plurality of reference road points are located on the center line of the current traveling lane of the autonomous driving vehicle or on the deviation line, and the width constraint is used for constraining a lateral offset of each obstacle avoidance road point in obstacle avoidance planning.

Then, obstacle avoidance planning is performed. Within the width constraint provided by the reference trajectory, a proper algorithm (including but not limited to a search-based algorithm, an equidistant curve-based algorithm, a key point-based algorithm, a polynomial-based algorithm, or the like) is selected to laterally move a road point or generate a new road point, to plan an obstacle avoidance trajectory that allows the autonomous driving vehicle to avoid an obstacle in the lane and that is completely within the width constraint.

It should be noted that a quantity of reference road points may be the same as or different from a quantity of obstacle avoidance road points. When the obstacle avoidance road points are road points generated by laterally moving the reference road points, the quantity of obstacle avoidance road points may be the same as the quantity of reference road points. When the obstacle avoidance road points are newly generated road points, the quantity of obstacle avoidance road points may be different from the quantity of reference road points. When the obstacle avoidance road points are newly generated road points compared with the reference road points, these newly generated road points are generated based on the reference road points and a width constraint of the reference road points.

Figure 9:
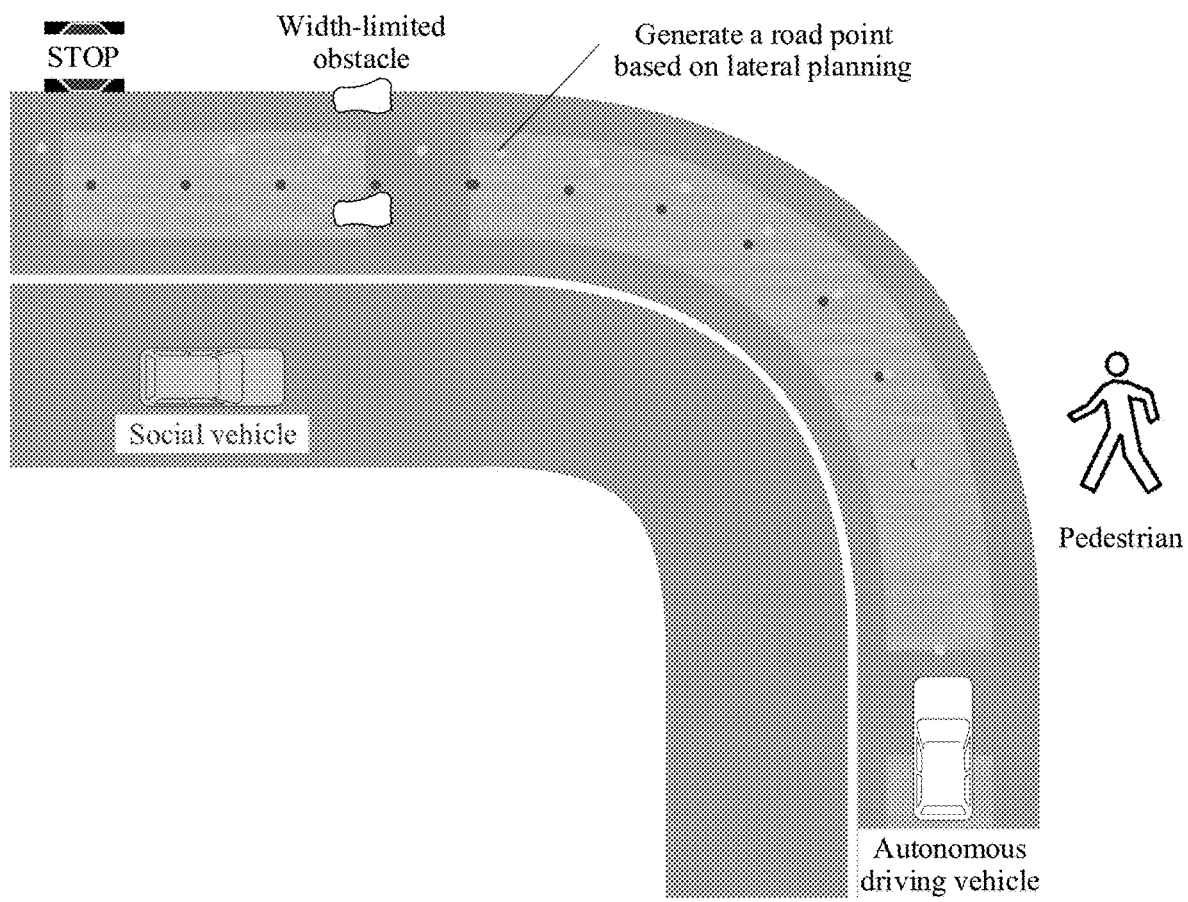
FIG. 9 is a schematic diagram of a lateral displacement planning process according to an embodiment of this disclosure.

As shown in FIG. 9, both of a social vehicle and a pedestrian are dynamic obstacles, and are not in the lane in which the autonomous driving vehicle currently travels. Therefore, lateral planning for the autonomous driving vehicle is not affected, and the autonomous driving vehicle needs to avoid a width-limited obstacle in the current traveling lane. Therefore, another visible dashed line that deviates from the lane center line is the obstacle avoidance trajectory that avoids the width-limited obstacle. The obstacle avoidance trajectory enables the autonomous driving vehicle to keep a preset distance, for example, 15 cm, from the obstacle.

Then, in this embodiment of this application, spatial filtering may be performed on the obstacle avoidance trajectory to smooth the obstacle avoidance trajectory, which is also referred to as trajectory smoothing processing. The trajectory smoothing processing is to make a planned trajectory more compliant with a human driving habit. In this embodiment of this application, as an optional step, gain processing may be performed on a road planned in this application. Specifically, the trajectory smoothing processing step includes but is not limited to performing processing by using the following smoothing filtering algorithms: a B-spline curve, Fourier filtering, Bessel curve filtering, and polynomial filtering.

A trajectory obtained after the foregoing smoothing processing is performed should completely fall within the width constraint of the reference trajectory. When there is a road point outside the width constraint in the trajectory that is smoothed, a part or all of road points of the obstacle avoidance trajectory need to be migrated to a lane center, and smoothing is performed again.

The following uses a quadratic Bessel curve filtering algorithm as an example.

$$B(t)=(1-t)^2 P_0 + 2(1-t)t P_1 + t^2 P_2$$

$P_0$ and $P_2$ are coordinates (x, y) of two selected road points. A point $P_1$ is calculated based on the two known points $P_0$ and $P_2$. Specifically, an intersection point of a curve tangent that passes through $P_0$ and a curve tangent that passes through $P_2$ is the point $P_1$, and coordinates of the intersection point are (x, y), where t is a parameter and a value range of t is [0,1]. A Bessel curve ensures that each point is infinitely continuous derivable, to meet a smoothness requirement.

Figure 10:
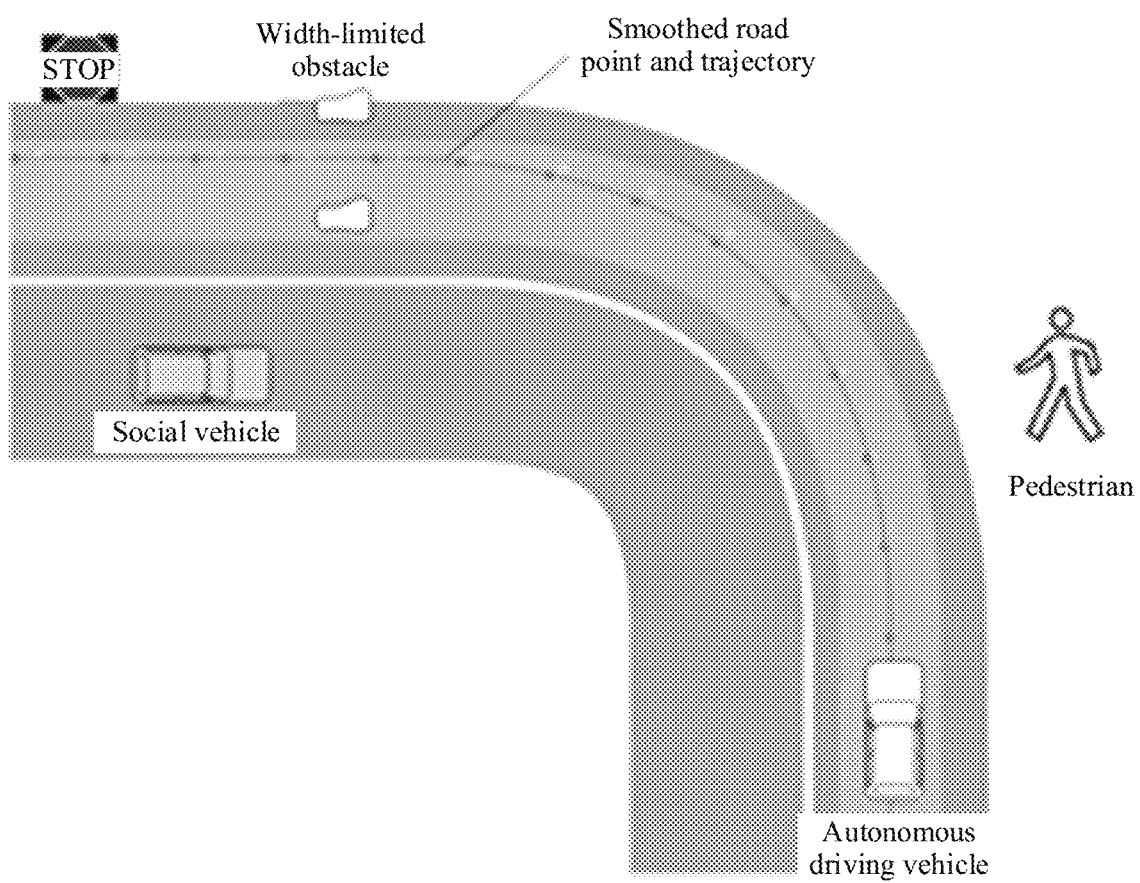
FIG. 10 is a schematic diagram of a lateral displacement planning process according to an embodiment of this disclosure.

As shown in FIG. 10, every three road points are used as an example for description. It may be found that every three road points are used as a curve to perform trajectory smoothing by using the quadratic Bessel function. First, a first road point and a fifth road point (which are merely examples) of the obstacle avoidance trajectory are obtained, tangent slopes of the first road point and the fifth road point are calculated, the two points are used as the point $P_0$ and the point $P_2$, a location of the point $P_1$ is calculated, and the location of the point $P_1$ is substituted into a formula of the quadratic Bessel curve filtering algorithm. A value of t ranges from 0 to 1 based on a preset step (for example, 0.1 or 0.2). For example, if the preset step is 0.2, values oft are sequentially 0, 0.2, 0.4, 0.6, 0.8, and 1, and a series of B(t) is calculated one by one to form a smooth trajectory. When a second segment of the smooth trajectory is calculated, a fifth road point and a ninth road point of the avoidance trajectory are used as the point $P_0$ and the point $P_2$, and the rest can be deduced by analogy. As shown by a solid line in a current traveling road of the autonomous driving vehicle in FIG. 11, the entire smooth trajectory is calculated.

It should be noted that, in the smoothing process, interpolation processing or sampling processing of road points may be performed on the to-be-smoothed obstacle avoidance trajectory. Therefore, a quantity of smooth road points included in the smooth trajectory and a quantity of obstacle avoidance road points included in the obstacle avoidance trajectory may be the same or may be different.

After the smooth trajectory is obtained, a step of generating an allowable lateral error is performed.

A method for generating an allowable lateral error includes but is not limited to the following examples.

Method 1:

A raster map is generated in a given area around the autonomous driving vehicle, for example, 50 m in the front, 10 m in the rear, and 20 m on the left and right separately. An obstacle is projected to the raster map. An area occupied by the obstacle is marked as occupied, and the occupied area is expanded by half of a width plus a preset safety length. The expansion is to expand the occupied area. For example, herein, a grid in an area radiated by the preset length around the occupied area is filled (the preset length herein may be half of a vehicle width plus the preset safety length). For example, the original occupied area of the obstacle is 0, and the occupied area is expanded to 1.

For each road point included in the trajectory that is smoothed, a series of checkpoints are generated leftward and rightward in a direction perpendicular to a tangent of the smooth trajectory at a preset interval, and these checkpoints are projected to the raster map, to find a left-side checkpoint and a right-side checkpoint that are of each road point in the smooth trajectory and that are farthest from the road point in an unoccupied area of the raster map. A distance between the point and the left-side checkpoint or the right-side checkpoint of the point is a single-side allowable lateral error, and a value of the distance is the allowable lateral error (a single side includes a left side or a right side, and the allowable lateral error also includes a left-side error and a right-side error; and in this application, there is no requirement on whether the left-side error and the right-side error are equal, and usually, values of the left-side error and the right-side error are not required to be equal).

A maximum allowable lateral error does not exceed a preset value, for example, 50 cm. When there is an obstacle in a vehicle traveling area, it is ensured that a distance between the vehicle and the obstacle is not less than 15 cm when the vehicle travels, at a boundary of the maximum allowable error, along the trajectory that is smoothed, where 15 cm and 50 cm are values in a value range [15,50] of the allowable lateral error on a single side (for example, the left side or the right side described above).

The checkpoint may be generated by using the following formula:

Coordinates of an $m^{th}$ checkpoint of a $k^{th}$ road point in the trajectory that is smoothed are $(x_{mk}^{new}, y_{mk}^{new})$.

$$x_{mk}^{new} = x_k + d_m \times \frac{y_{k+1} - y_k}{\sqrt{(x_{k+1} - x_k)^2 + (y_{k+1} - y_k)^2}}$$

$$y_{mk}^{new} = y_k - d_m \times \frac{x_{k+1} - x_k}{\sqrt{(x_{k+1} - x_k)^2 + (y_{k+1} - y_k)^2}}$$

$(x_k, y_k)$ and $(x_{k+1}, y_{k+1})$ are respectively coordinates of the $k^{th}$ road point and a $(k+1)^{th}$ road point on the lane center line, and the coordinates are coordinates in ENU. $d_m$ is related to a step of generating a candidate checkpoint, and a value of $d_m$ is equal to a distance between each candidate checkpoint and a road point corresponding to the candidate checkpoint. For example, when m is equal to 2, the value of $d_m$ is equal to a distance between a second candidate checkpoint and a road point corresponding to the second candidate checkpoint.

As described above, when a checkpoint is determined, one road point is used as an example. A string of candidate checkpoints (namely, a plurality of possible checkpoints) are initially preset for the road point, and then whether the point is an occupied point in the raster map is determined one by one for each of the string of candidate checkpoints (from inside to outside along the road point) until it is determined that the point is a first occupied point, and a point before the point is determined as a final checkpoint, namely, a farthest point to which the lateral error is allowed to reach.

Method 2:

After an obstacle is projected to a raster map and expansion is performed, a distance transformation algorithm may be used to obtain a distance from each road point that is smoothed to an occupied area (an occupied area in the raster map) closest to the road point. The distance may be used as the allowable lateral error, and the error is limited to a preset threshold, for example, a value interval of [15 cm, 50 cm].

Figure 11:
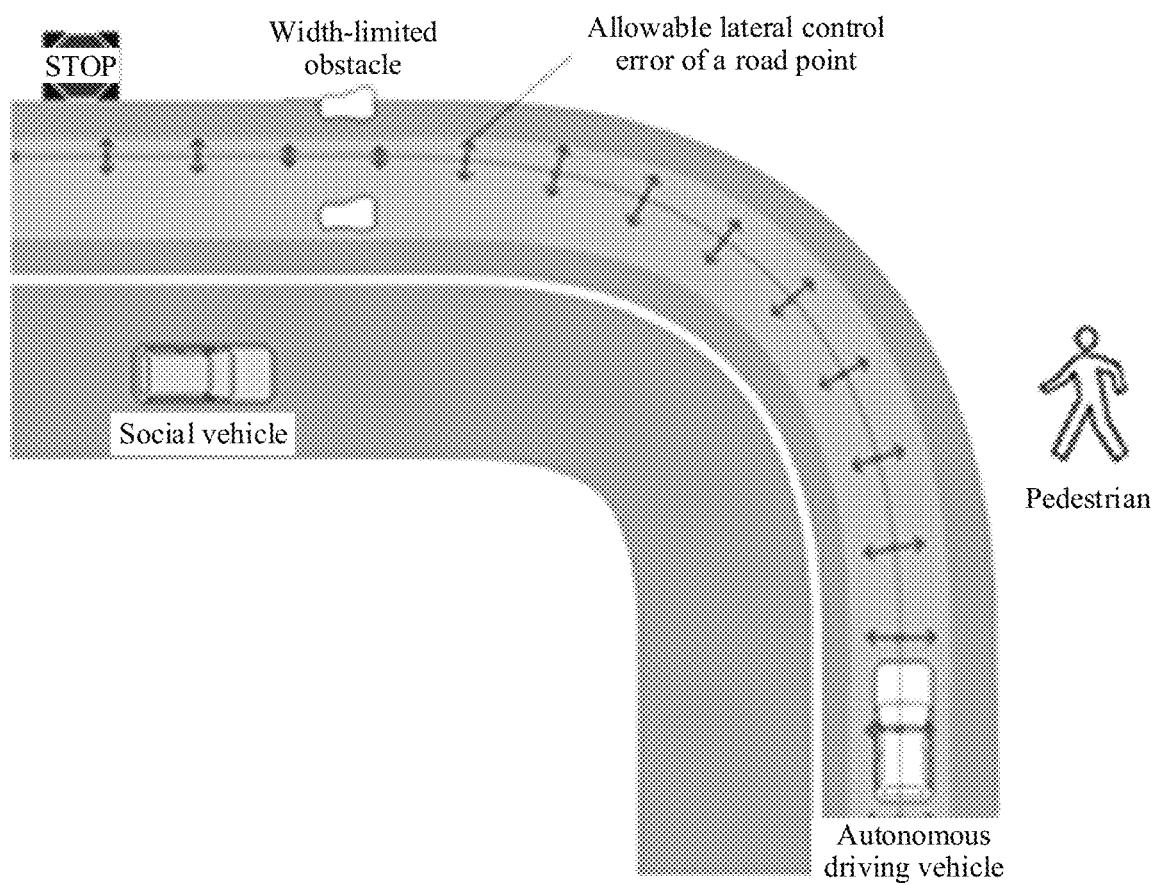
FIG. 11 is a schematic diagram of a lateral displacement planning process according to an embodiment of this disclosure.

As shown in FIG. 11, the allowable lateral error is indicated by an arrow that passes through a road point in the figure. An arrow that passes through a road point and points to a left side is a lateral error allowed when the autonomous driving vehicle derives to the left. Similarly, an arrow that passes through a road point and points to a right side is a lateral error allowed when the autonomous driving vehicle derives to the right. It can be learned from the figure that, when the autonomous driving vehicle is far away from a width-limited obstacle, a value of the allowable lateral error is large; and when the autonomous driving vehicle is close to the width-limited obstacle, the value of the allowable lateral error is small. This ensures that the autonomous driving vehicle safely passes through the width-limited obstacle.

The following describes work of the longitudinal speed planner 602.

First, it should be noted that the longitudinal speed planner 602 inherits output of the lateral displacement planner 601 (the output includes the N road points, and each of the N road points includes coordinates of the road point and the allowable lateral error). The longitudinal speed planner 602 plans the target traveling trajectory including then road points, where then road points are the n road points of the N road points included in the preliminary traveling trajectory output by the lateral displacement planner 601. In other words, 602 inherits the n road points (including coordinates of the n road points and the allowable lateral error) from the N road points output by 601, and further performs speed (or speed and allowable speed error) planning for the n road points, so that each of the n road points included in the target traveling trajectory output by 602 further includes, in addition to coordinate information and allowable lateral error information that are inherited from 601, speed (or speed and allowable speed error) information obtained through processing performed by 602. A value of n may be less than N, or may be equal to N.

A speed upper limit is obtained based on the following three cases of speed planning.

1: Background Speed Planning

Traffic light information, stop sign information, and speed limit information are received, and a speed constraint of each road point (an upper limit of the drivable speed of the autonomous driving vehicle at each of the n road points) is planned, where specific rules are as follows.

(1): A speed rule based on a traffic lights: If there are red lights in front of the autonomous driving vehicle, a speed corresponding to each road point decreases gradually from a current location of the autonomous driving vehicle to a stop line of the traffic lights, and finally decreases to 0.

(2): A speed rule based on a stop sign: If there is a stop sign in front of the autonomous driving vehicle, a speed corresponding to each road point decreases gradually from a current location of the autonomous driving vehicle to a stop line of the stop sign, and finally decreases to 0.

(3): A speed rule based on a road speed limit: If a road speed limit is known, a speed corresponding to each road point should be equal to the speed limit. If the speed limit changes suddenly, the speed corresponding to each road point should be updated to a new speed limit based on a specified change rate.

It should be noted that, when a task of the autonomous driving vehicle is to keep a lane, reference speed planning of the autonomous driving vehicle needs to be performed with reference to the foregoing one to three speed rules. Finally, an upper limit of a speed planned for each road point in this phase is a smallest value of the foregoing one to three speeds. However, when the task of the autonomous driving vehicle is to change the lane, reference speed planning provided in Embodiment 3 is used for reference. For details, refer to Embodiment 3.

Figure 12:
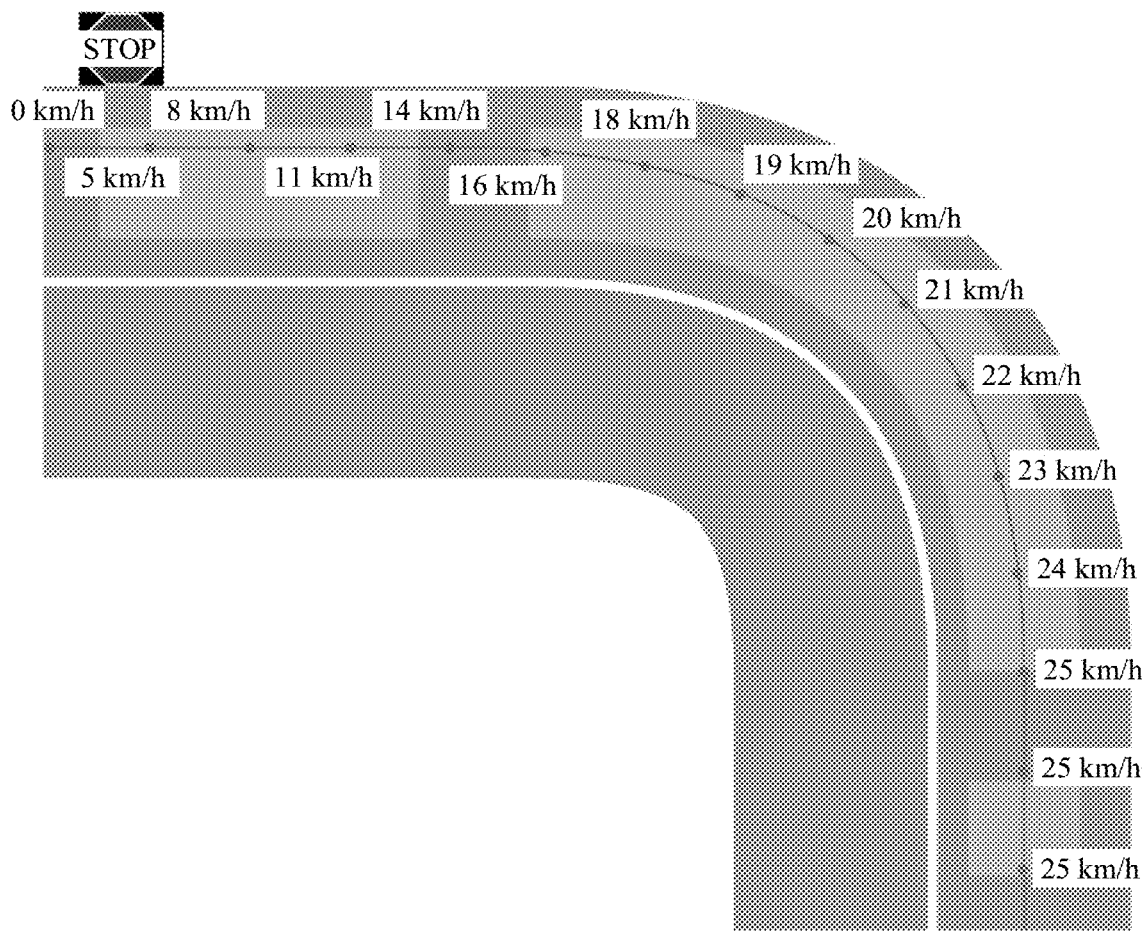
FIG. 12 is a schematic diagram of a longitudinal speed planning process according to an embodiment of this disclosure.

As shown in FIG. 12, if the road speed limit is 25 km/h and there is a stop sign in front of the autonomous driving vehicle, the autonomous driving vehicle should stop at the stop sign according to the traffic rules. Background speed planning work described above may include: planning, along road points, a speed constraint along the road points that gradually decreases to 0. To ensure comfort of a passenger on the autonomous driving vehicle, a planned deceleration may be limited within a preset value range, for example, 0.05 g.

2: Curvature Speed Planning

A curvature of each road point (each of the n road points) is calculated based on the road point and several road points adjacent to the road point, and then a speed constraint of passing through each road point is obtained based on a preset lateral acceleration. The preset lateral acceleration is an empirical calibration value in consideration of safety and comfort.

Figure 13:
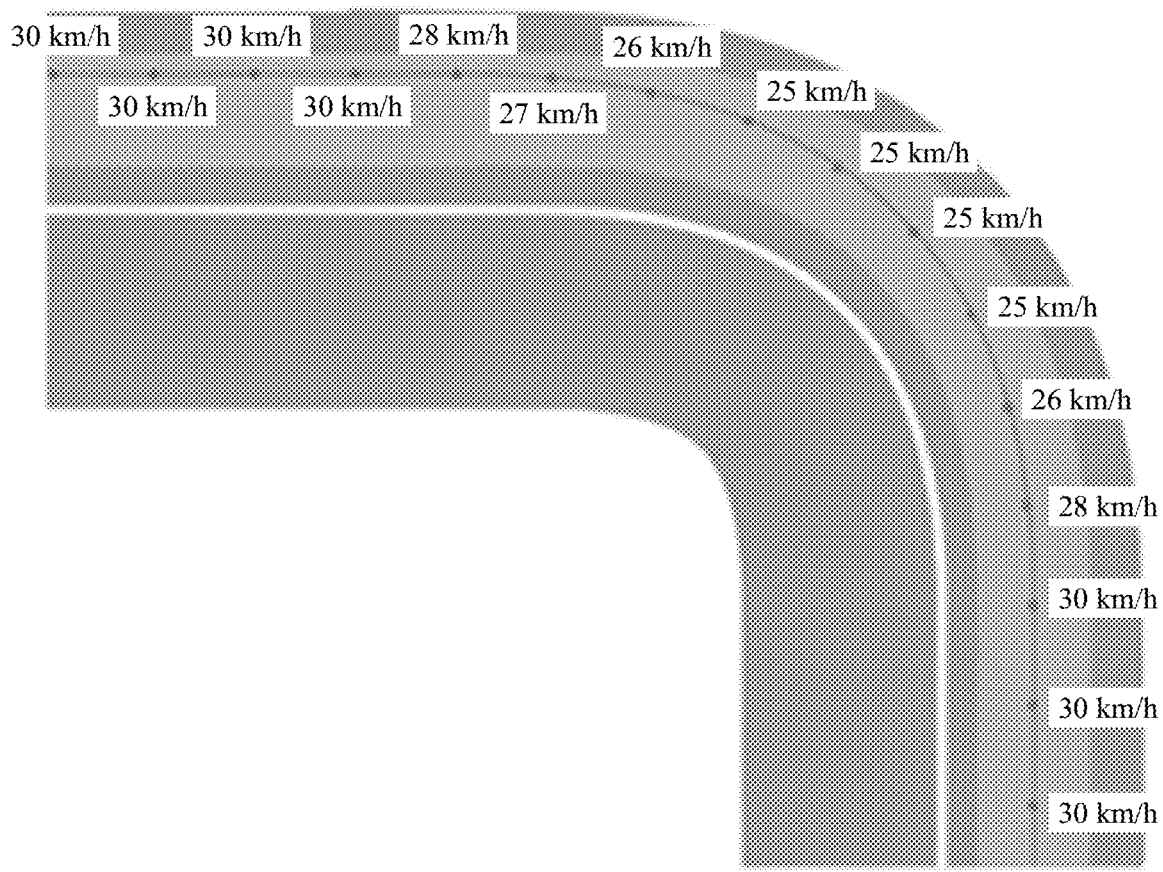
FIG. 13 is a schematic diagram of a longitudinal speed planning process according to an embodiment of this disclosure.

As shown in FIG. 13, a trajectory planned for the autonomous driving vehicle approximates to "straight line-arc-straight line". Along each road point, the road point and two road points adjacent to the road point are selected, and there are three road points in total (the quantity is only an example). A curvature radius r (namely, a radius of a circumcircle of a triangle passing through the three points) of the point is calculated according to the following formula (the Qinjiushao-Helen formula):

$$a = \sqrt{(x_1 - x_2)^2 + (y_1 - y_2)^2}$$
$$b = \sqrt{(x_1 - x_3)^2 + (y_1 - y_3)^2}$$
$$c = \sqrt{(x_2 - x_3)^2 + (y_2 - y_3)^2}$$
$$p = 0.5(a + b + c)$$
$$S = \sqrt{p(p-a)(p-b)(p-c)}$$
$$r = \frac{abc}{4S}$$

$(x_1, y_1)$, $(x_2, y_2)$, and $(x_3, y_3)$ are x and y coordinates of the three points. A case in which a denominator is 0 is considered. When S is smaller than 0.01, 0.01 is used for calculation, and then a speed limit at this point is calculated according to $v_{lim} = \sqrt{ar}$. a=0.2 g is an allowable lateral acceleration, and a calculation result is shown in FIG. 13.

3: Joint Lateral Error Speed Planning

As shown in FIG. 6, the allowable lateral error (an allowable lateral displacement error value, referred to as the allowable lateral error for short) generated by the lateral displacement planner 601 is used as input to generate the allowable speed error. A specific method includes:

Any one road point is used as an example. Table lookup is performed in a reverse lookup table based on an allowable lateral error of the road point to obtain a speed constraint corresponding to the road point; or the allowable lateral error of the road point is substituted into a function to obtain the speed constraint corresponding to the road point.

Figure 14:
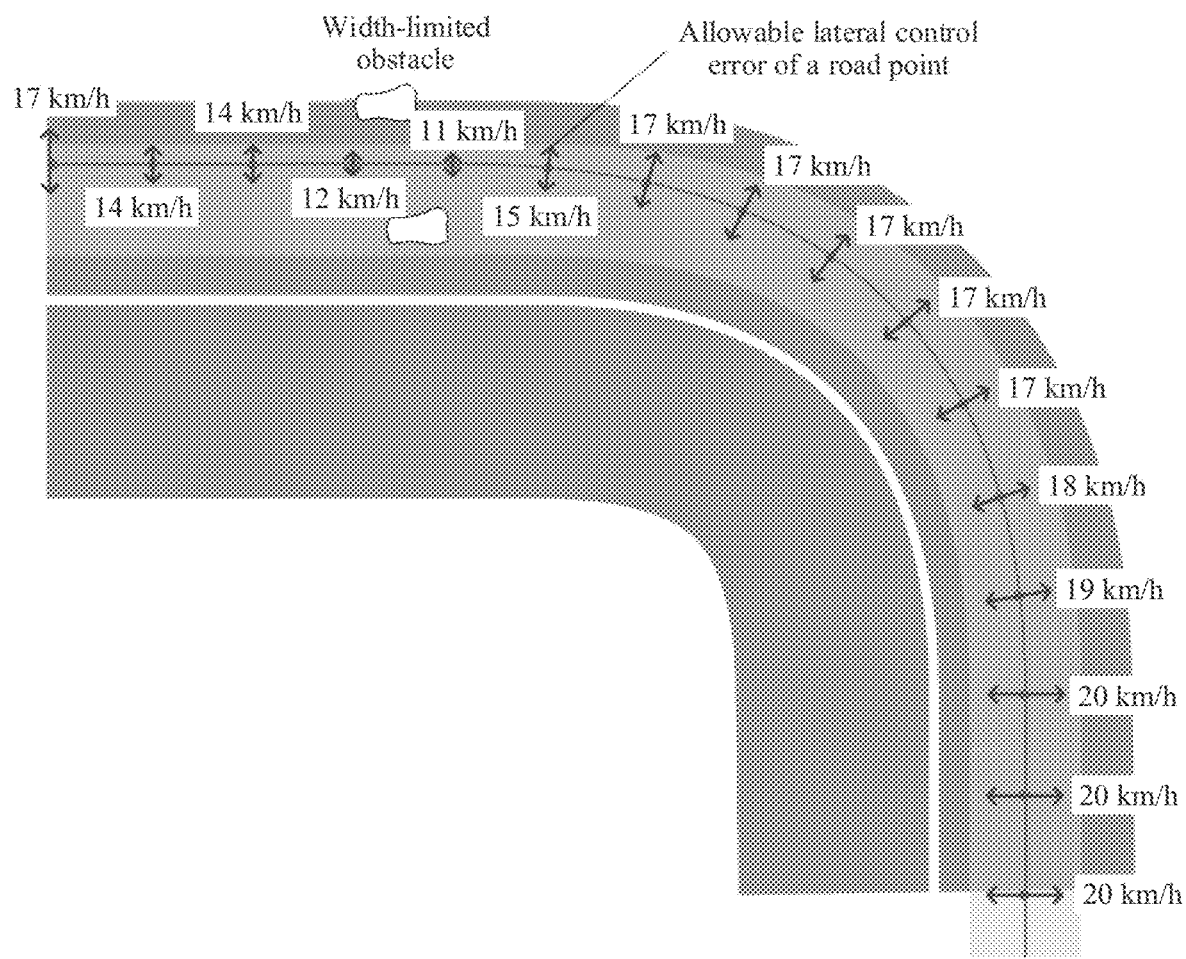
FIG. 14 is a schematic diagram of a longitudinal speed planning process according to an embodiment of this disclosure.

As shown in FIG. 14, it may be learned that a smaller allowable lateral error corresponds to a smaller speed constraint. This is because a higher speed indicates lower control precision, and only when the allowable lateral error is larger, lower control precision can be tolerated.

Therefore, as shown in FIG. 14, according to the speed rule, a larger speed constraint is planned for a road point with a larger allowable lateral error, and a smaller speed constraint is planned for a road point (for example, a road point on a road section with a width-limited obstacle) with a smaller allowable lateral error.

In the foregoing three cases of speed planning, three recommended speed constraints are provided for each road point. One road point is used as an example. The foregoing three cases of speed planning each provide a recommended value of a speed constraint for the road point. Therefore, the road point includes recommended values of three speed constraints. A smallest recommended value of the recommended values of the three speed constraints is used as a speed upper limit of the road point. After a same operation (a smallest speed is selected) is performed on each road point, the road point includes the speed upper limit of the road point. The speed upper limit is used for further constraining a value range of the drivable speed of the autonomous driving vehicle at the road point.

After the speed upper limit of each road point is obtained, the drivable speed (also referred to as a target speed) of the autonomous driving vehicle and the allowable speed error need to be determined for each road point based on the speed upper limit. The allowable speed error is an error range of upward or downward fluctuation allowed at each road point based on the target speed of the road point. The allowable speed error may be used as an option. In other words, in the solution provided in this embodiment of this application, only the drivable speed of the autonomous driving vehicle at each road point may be determined, and the allowable speed error is not determined.

A method for determining the drivable speed of the autonomous driving vehicle may include:

An ST diagram (as shown in a diagram A in FIG. 17) including an obstacle occupied area is generated based on perception data. The ST diagram includes a T (time) axis and an S (displacement) axis, the ST diagram includes a law of relative displacement changing with time, and the relative displacement includes displacement of an obstacle relative to the autonomous driving vehicle. The perception data is data collected by a sensor, and the data includes information about an obstacle existing in an environment of the autonomous driving vehicle, and the like.

The obstacle may include an obstacle, for example, a vehicle other than the autonomous driving vehicle, a pedestrian, a bicycle, or the like that has potential or direct impact on driving of the autonomous driving vehicle.

Figure 17:
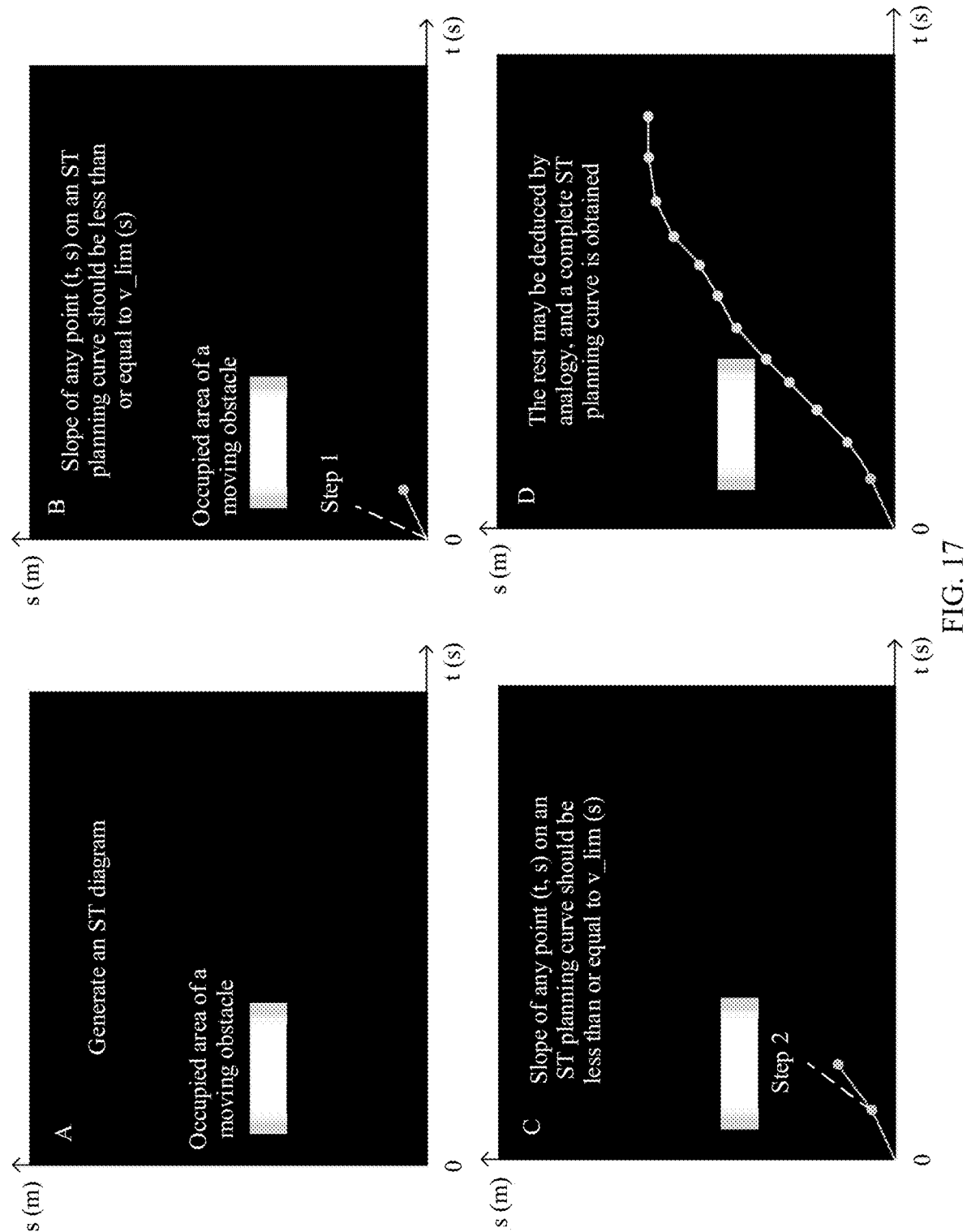
FIG. 17 is a schematic diagram of an ST curve planning process in a longitudinal speed planning process according to an embodiment of this disclosure.

A location of a point $i_j$ in the ST diagram is determined based on a preset algorithm and a speed upper limit. j is successively selected from 1 to n (as shown in a diagram B to a diagram D in FIG. 17), to generate an ST planning curve that avoids the obstacle occupied area. The ST planning curve includes n points from $i_1$ to $i_n$ (as shown in the diagram D in FIG. 17), and the n points are in a one-to-one correspondence with the n road points. As shown in the diagram D in FIG. 17, each of the n points corresponds to one S/T value (a speed is displacement divided by time) in the ST diagram, and the S/T value is a drivable speed of the autonomous driving vehicle at a road point corresponding to the point. The ST diagram may be generated by considering predicted trajectories of all moving obstacles (including moving obstacles outside a lane). The diagram A in FIG. 17 is shown only by using a pedestrian (the obstacle includes a pedestrian) as an example.

Further, optionally, in this embodiment of this application, the allowable speed error may be further generated for each of the n road points.

A method for generating the allowable speed error is similar to the method for generating the allowable lateral error, but a process of generating the allowable lateral error relies on the raster map, and a process of generating the allowable speed error relies on the ST diagram. As described above, the ST diagram includes two coordinate axes: the T (time) axis and the S (displacement) axis. The T axis uses an origin as a current moment, and the S axis uses the origin as a current location of the autonomous driving vehicle. A value of any point is between [0,1], which means that if the value is greater than 0 and less than 1, there is a risk that a location s at a moment t is occupied.

Details are described below in detail with reference to the accompanying drawings.

A method for generating a drivable speed and an allowable speed error (an allowable longitudinal speed error value, referred to as the allowable speed error for short) may be specifically described as follows.

First, a correspondence v_lim (s) between a speed upper limit and a road length s is generated. The speed upper limit is also referred to as a speed constraint v_lim, and the correspondence is strongly related to the autonomous driving vehicle and current environment information of the autonomous driving vehicle.

Figure 15:
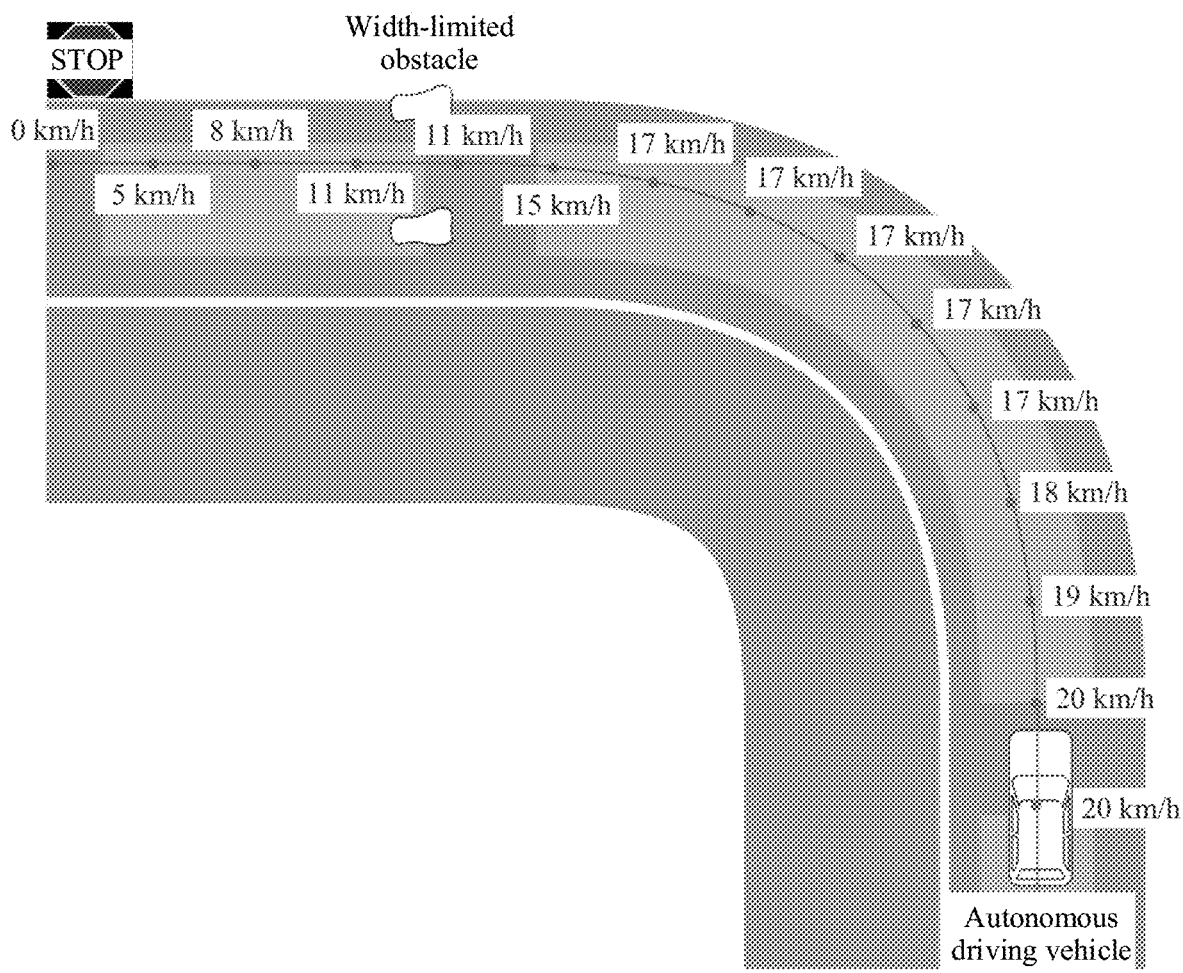
FIG. 15 is a schematic diagram of a longitudinal speed planning process according to an embodiment of this disclosure.
Figure 16:
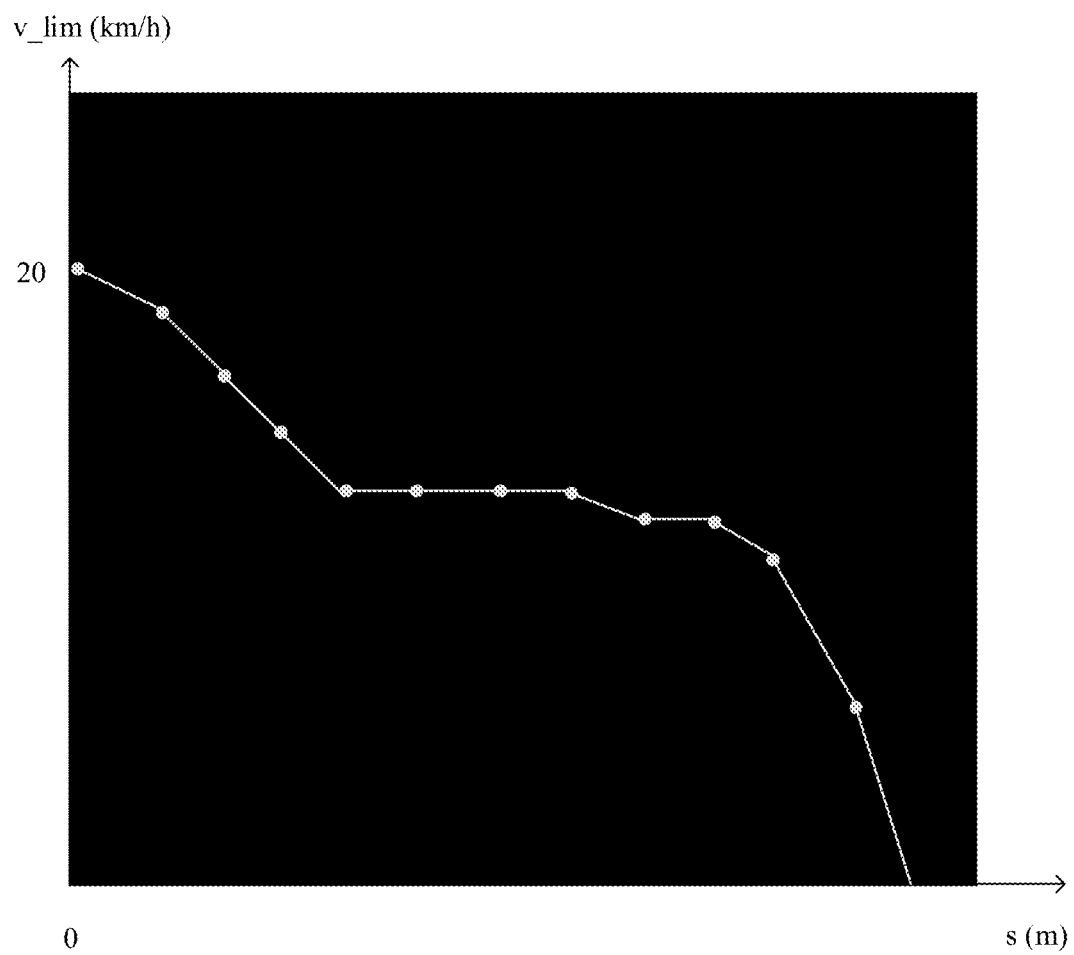
FIG. 16 is a schematic diagram of a correspondence v_lim (s) between a speed constraint v_lim and a road length s according to an embodiment of this disclosure.

FIG. 15 is used as an example. The autonomous driving vehicle starts from the current location, passes through the width-limited obstacle, and finally stops at the stop sign. The correspondence v_lim (s) that is between a speed constraint v_lim and a road length s and that is corresponding to the autonomous driving vehicle is shown in FIG. 16. Refer to FIG. 16 with reference to FIG. 15. The autonomous driving vehicle starts from the current location (namely, a point 0 on the S axis), and a speed of the autonomous driving vehicle at the current location is 20 km/h. Before the autonomous driving vehicle is about to enter a passage formed by width-limited obstacles, the speed of the autonomous driving vehicle gradually decreases from 20 km/h to 11 km/h, and then the autonomous driving vehicle passes through the passage formed by the width-limited obstacles at a constant speed of 11 km/h (which is indicated by a horizontal line segment in FIG. 16). After the autonomous driving vehicle passes through the passage, the speed rapidly decreases to 0 within a short distance and time, so that the autonomous driving vehicle stops at the stop sign (which is indicated by a line segment with a steeper end in FIG. 16, where a last value of a V axis is 0).

Then, the predicted trajectories of all the moving obstacles (including the moving obstacles outside the lane) are considered to generate the ST diagram (the diagram A in FIG. 17).

As shown in FIG. 17, an example in which the pedestrian is the foregoing moving obstacle is used.

In the diagram A in FIG. 17, the moving obstacle, namely, the pedestrian, is about to cross a road. A volume of the moving obstacle is considered, the moving obstacle intrudes into the lane of the autonomous driving vehicle in a period of time, and an occupied length is approximately a constant. Therefore, an occupied area of the moving obstacle in the ST diagram shown in the diagram A is approximately a rectangle.

Uncertainty of the moving obstacle and the allowable lateral error of the autonomous driving vehicle are considered. The occupied area, for example, an area whose color gradually changes to gray in the diagram A, of the moving obstacle is expanded outward. Then, within a constraint of the speed upper limit and based on the preset algorithm, a speed of the autonomous driving vehicle at an initial moment (the drivable speed of the autonomous driving vehicle at the road point) is planned. Because s of a start location that is of the autonomous driving vehicle and that is corresponding to the initial moment is equal to 0, as shown in the diagram B in FIG. 17, a planned speed cannot be greater than a speed upper limit v_lim (0). Then, a next moment is a new start moment, and s of a start location at the new start moment is equal to s1. In this case, as shown in the diagram C in FIG. 17, a planned speed at this moment cannot be greater than a speed constraint v_lim (s1). The rest may be deduced by analogy, and as shown in the diagram D in FIG. 17, a complete ST planning curve is finally obtained. It may be learned that because the four diagrams in FIG. 17 are all ST diagrams, that is, time is used as a lateral axis, and displacement is used as a longitudinal axis. In this case, a tangent slope of a curve in the diagram indicates a speed in a process in which the autonomous driving vehicle travels forward from the start location whose s is 0. For example, if time consumed in a process in which traveling displacement is s1 is t1, a slope of a step 1, namely, a speed of the step 1, is s1/t1.

It should be noted that the n points in the diagram D in FIG. 17 do not directly indicate the n road points, but are in the one-to-one correspondence with the n road points. Each of the n points corresponds to one S/T value in the diagram, and the value is a drivable speed of a road point corresponding to the point.

The following describes the method for generating an allowable speed error.

Figure 18:
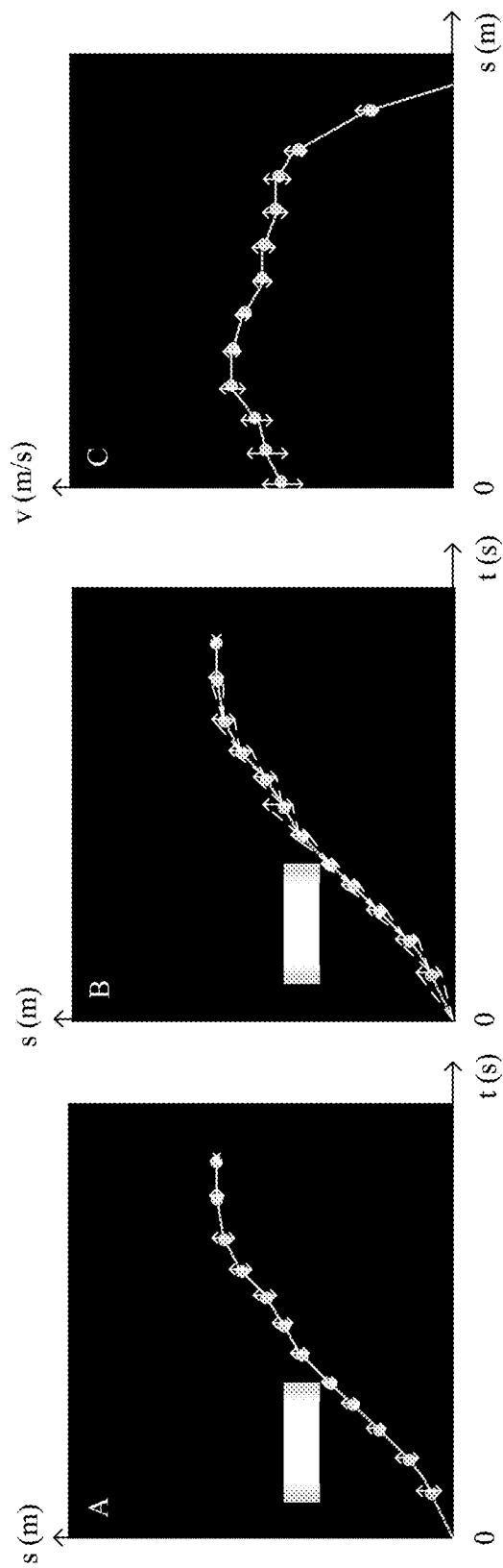
FIG. 18 is a schematic diagram of an allowable speed error generation process in a longitudinal speed planning process according to an embodiment of this disclosure.

As shown in FIG. 18, an allowable longitudinal displacement error of an ST planning curve is generated without a collision with an occupied area, and then converted into an allowable speed error.

In the ST diagram, as shown in a diagram A in FIG. 18, after the occupied area is expanded by considering an allowable lateral control error of the autonomous driving vehicle, for each point in the ST planning curve, checkpoints are generated upward and downward at a specific step (for example, 0.2 m) along a longitudinal axis (that is, in an S-axis direction).

Then, as shown in a diagram B in FIG. 18, each point in the ST planning curve is processed as follows: An $(i+1)^{th}$ point is used as an example. Two farthest checkpoints that are on upper and lower sides of the $(i+1)^{th}$ point and that are located in an unoccupied area in the ST diagram are found, and the two checkpoints on the upper and lower sides of the $(i+1)^{th}$ point are separately connected to an $i^{th}$ point in the ST planning curve to generate two connection lines, where slopes of the two connection lines are upper and lower limits of an allowable speed error of the $(i+1)^{th}$ point. Optionally, the slope of the upper limit of the allowable speed error herein cannot be greater than the slope of the speed upper limit provided by the longitudinal speed planner 602 (the slope of the speed upper limit is indicated by dashed lines in the diagrams B and C in FIG. 17).

Finally, as shown in a diagram C in FIG. 18, a result of the diagram B in FIG. 18 is converted into a curve shown in the diagram C in FIG. 18 by using displacement as a lateral axis and using a slope (namely, a drivable speed) corresponding to each point on the ST curve as a longitudinal axis. In the diagram C in FIG. 18, each speed point has an allowable speed error. When there is no occupied area around, the allowable speed error of the point $(i+1)^{th}$ on the ST planning curve should be less than a given threshold, for example, 5 km/h. When there is an occupied area, the allowable speed error of the point $(i+1)^{th}$ on the ST planning curve should be greater than a given value, for example, 0.5 km/h. The $(i+1)^{th}$ point may be a current road point.

The planner finally outputs a target traveling trajectory through the foregoing related processing of the lateral displacement planner 601 and the longitudinal speed planner 602. Each of n road points on the target traveling trajectory includes coordinates and an allowable lateral error of the road point, a drivable speed of the autonomous driving vehicle at the road point, and an allowable speed error of the road point, where the allowable speed error is optional information.

Based on Embodiment 3, the target traveling trajectory may be further output to the controller, and the controller performs a related operation based on the target traveling trajectory, to output a throttle or brake control value and a steering wheel angle.

Embodiment 3

In both of Embodiment 1 and Embodiment 2, work of the motion planner is described by using an example in which the task of the autonomous driving vehicle is to keep a lane. The following describes work of the motion planner when the task of the autonomous driving vehicle is to change a lane. In other words, it is assumed that a high-level decision delivered by the behavior planner to the autonomous driving vehicle is to change a lane.

When a requirement of the autonomous driving vehicle is to change a lane, a difference from Embodiment 1 and Embodiment 2 lies in that, start road points of the reference trajectory determined by the lateral displacement planner 601 are a part of road points of a lane center line of a current lane, and end road points are a part of road points of a lane center line of a target lane to be changed to. The two road points are connected in a smooth manner, and a left-right width constraint of each road point may be set based on an empirical value, for example, 20 cm.

Figure 19:
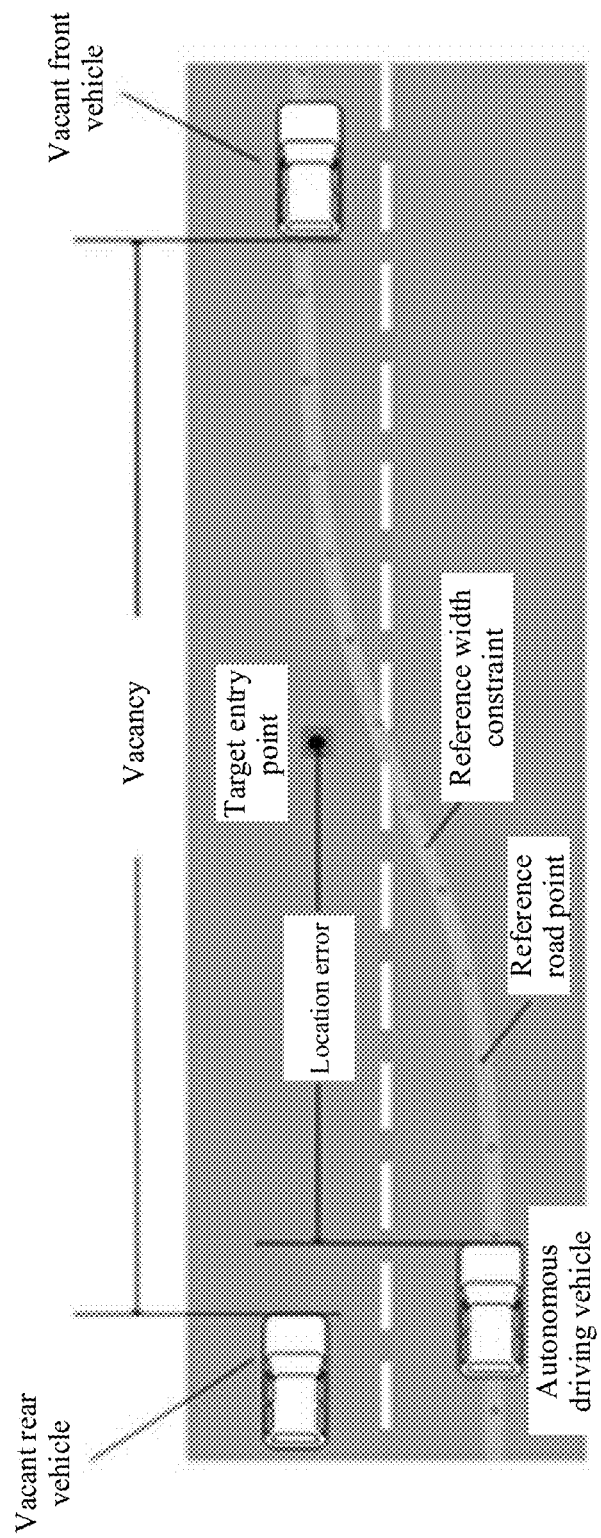
FIG. 19 is a schematic diagram of a trajectory planning process according to an embodiment of this disclosure.

As shown in FIG. 19, the autonomous driving vehicle travels on a current road, and a task of the autonomous driving vehicle is to change to a target road. There are two vehicles on the target lane. One is referred to as a vacant front vehicle, and the other is referred to as a vacant rear vehicle. The vacant front vehicle and the vacant rear vehicle forms a vacancy. The autonomous driving vehicle needs to enter the target lane through the vacancy, and a target entry point may be a central location of the vacancy.

In addition, a difference from Embodiment 1 and Embodiment 2 lies in that, when performing reference speed planning, the longitudinal speed planner 602 needs to receive traffic light information, stop sign information, speed limit information, and target vacancy information of the to-be-entered target lane, to plan a speed constraint of each road point.

In other words, a difference from the task of keeping a lane lies in that, when a lane is changed to, in addition to the three speed rules, to be specific, "the speed rule based on traffic lights", "the speed rule based on a stop sign", and "the speed rule based on a road speed limit", "a speed rule based on a speed limit of a target vacancy" further needs to be considered in a reference speed planning phase.

Specifically, according to the speed rule based on a speed limit of a target vacancy, when the autonomous driving vehicle needs to change a lane, a speed corresponding to each road point along a way from a current road point to a to-be-entered point is planned based on a length of the target vacancy, a longitudinal distance between the autonomous driving vehicle and the to-be-entered point of the target vacancy, and speeds of front and rear vehicles of the target vacancy, so that the autonomous driving vehicle is always at a point between the front vehicle and the rear vehicle after entering the lane (this point can ensure that the autonomous driving vehicle does not collide with the front vehicle and the rear vehicle). The length of the target vacancy indicates a length of a distance between the rear of the front vehicle and the front of the rear vehicle in the target vacancy. The to-be-entered point may be a center point between the front vehicle and the rear vehicle in the target vacancy, or a point at which the center point moves forward or backward by a preset length, to ensure that the autonomous driving vehicle does not collide with the front vehicle and the rear vehicle in the target lane when the autonomous driving vehicle enters the target lane.

It should be noted that a fourth speed rule (namely, the speed rule based on a speed limit of a target vacancy) needs to be considered only when the task of the autonomous driving vehicle is to change a lane. When the task of the autonomous driving vehicle is to change a lane, reference speed planning of the autonomous driving vehicle needs to be performed with reference to the foregoing four speed rules. A speed upper limit planned for each road point in this phase (the reference speed planning phase) is a smallest value of the foregoing one to four speeds.

In addition to the foregoing clear differences, for other steps, to avoid redundancy, refer to description of related steps in Embodiment 3. Details are not described again.

Embodiment 4

Figure 20:
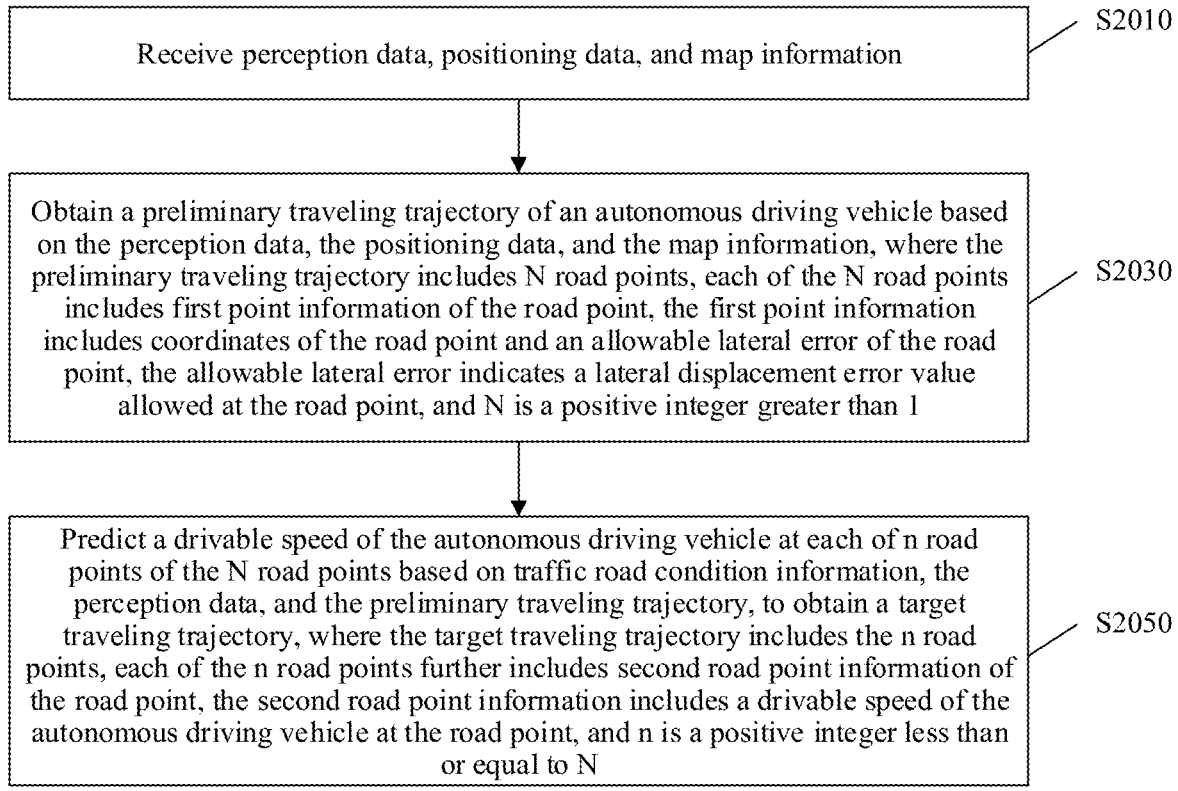
FIG. 20 is a schematic diagram of a trajectory planning method according to an embodiment of this disclosure.

As shown in FIG. 20, an embodiment of this application provides a trajectory planning method, where the method is applied to an autonomous driving vehicle. The method includes the following steps.

S2010: Receive perception data, positioning data, and map information.

S2030: Obtain a preliminary traveling trajectory of the autonomous driving vehicle based on the perception data, the positioning data, and the map information, where the preliminary traveling trajectory includes N road points, each of the N road points includes first point information of the road point, the first point information includes coordinates of the road point and an allowable lateral error of the road point, the allowable lateral error indicates a lateral displacement error value allowed at the road point, and N is a positive integer greater than 1.

S2050: Predict a drivable speed of the autonomous driving vehicle at each of n road points of the N road points based on traffic road condition information, the perception data, and the preliminary traveling trajectory, to obtain a target traveling trajectory, where the target traveling trajectory includes the n road points, each of the n road points further includes second road point information of the road point, the second road point information includes a drivable speed of the autonomous driving vehicle at the road point, and n is a positive integer less than or equal to N.

Based on Embodiment 4, optionally, S2030 specifically includes:

obtaining a reference trajectory based on the positioning data and the map information, where the reference trajectory includes $R_1$ reference road points and a width constraint, the $R_1$ reference road points are located on a center line of a lane in which the autonomous driving vehicle is currently located or on a deviation line of the center line, the width constraint is used for constraining, in an obstacle avoidance planning process, an offset of each reference road point from lateral displacement of a current location of the reference road point, and the deviation line is a line that deviates from a preset range of the center line;

performing obstacle avoidance planning on the reference trajectory based on the perception data, the $R_1$ reference road points, and the width constraint, and generating an obstacle avoidance trajectory, where the obstacle avoidance trajectory includes $R_2$ obstacle avoidance road points, and each of the $R_2$ obstacle avoidance road points includes coordinates of the obstacle avoidance road point; and determining, according to an allowable lateral error generation rule, an allowable lateral error corresponding to each of the $R_2$ obstacle avoidance road points, to obtain the preliminary traveling trajectory, where the N road points included in the preliminary traveling trajectory are the $R_2$ obstacle avoidance road points.

Optionally, after the generating an obstacle avoidance trajectory, S2030 further includes: performing trajectory smoothing processing on the obstacle avoidance trajectory, and generating a smooth trajectory, where the smooth trajectory includes $R_3$ smooth road points, and each of the $R_3$ smooth road points includes coordinates of the smooth road point.

Correspondingly, the determining, according to an allowable lateral error generation rule, an allowable lateral error corresponding to each of the $R_2$ obstacle avoidance road points, to obtain the preliminary traveling trajectory includes:

determining, according to the allowable lateral error generation rule, an allowable lateral error corresponding to each of the $R_3$ smooth road points, to obtain the preliminary traveling trajectory, where the N road points included in the preliminary traveling trajectory are the $R_3$ smooth road points.

Optionally, S2050 includes:

generating, based on the perception data, an ST diagram including an obstacle occupied area, where the ST diagram includes a T (time) axis and an S (displacement) axis, the ST diagram includes a law of relative displacement changing with time, and the relative displacement includes displacement of an obstacle relative to the autonomous driving vehicle; and determining, based on a preset algorithm and a speed upper limit, a location of a point $i_j$ in the ST diagram, where j is successively selected from 1 to n, to generate an ST planning curve that avoids the obstacle occupied area, the ST planning curve includes n points from $i_1$ to $i_n$, the n points are in a one-to-one correspondence with the n road points, and an S/T value corresponding to each of the n points in the ST diagram is the drivable speed of the autonomous driving vehicle at each of the n road points, where the speed upper limit is used for constraining a value range of the drivable speed in a process of generating the ST planning curve, and the speed upper limit is obtained based on the traffic road condition information and the preliminary traveling trajectory.

Optionally, before the determining, based on a preset algorithm and a speed upper limit, a location of a point $i_j$ in the ST diagram, S2050 further includes: performing speed planning on each of the n road points based on the traffic road condition information, to obtain first speed constraints of the n road points;

obtaining, based on an allowable lateral error of each of then road points, second speed constraints, of then road points, corresponding to the allowable lateral errors of then road points; and determining that a speed constraint with a smallest value in a plurality of speed constraints included in each of the n road points is the speed upper limit, where the plurality of speed constraints include the first speed constraint and the second speed constraint.

Optionally, before the determining, based on a preset algorithm and a speed upper limit, a location of a point $i_j$ in the ST diagram, S2050 further includes:

calculating a curvature of each road point based on each of then road points and x road points adjacent to the road point, where x is a positive integer greater than 0; and obtaining a third speed constraint of each road point based on the curvature of the road point and a maximum allowable lateral acceleration of the road point, where the plurality of speed constraints further includes the third speed constraint.

Optionally, S2050 further includes:

generating an allowable speed error of each of the n road points based on the ST diagram, the ST planning curve, and the speed upper limit, where the second road point information further includes the allowable speed error, and the allowable speed error is used for indicating a speed error allowed at each of then road points.

Optionally, S2050 further includes:

separately generating, in the ST diagram, an upper checkpoint upward and a lower checkpoint downward along the S axis for a point $i_{j+1}$, where the upper checkpoint and the lower checkpoint are determined based on an allowable longitudinal displacement error of the point $i_{j+1}$, the allowable longitudinal displacement error is a displacement error allowed at the point $i_{j+1}$ along a positive or negative direction of the S axis in the ST diagram, the point $i_{j+1}$ is a point at a next moment of the point $i_j$, the point $i_j$ is any point in the n points other than a point $i_n$, and duration of one moment is preset duration; and connecting the point $i_j$ to the upper checkpoint to obtain a first slope, and connecting the point $i_j$ to the lower checkpoint to obtain a second slope, where the first slope and the second slope are used for indicating an allowable speed error of a road point corresponding to the point $i_j$.

Embodiment 5

Figure 21:
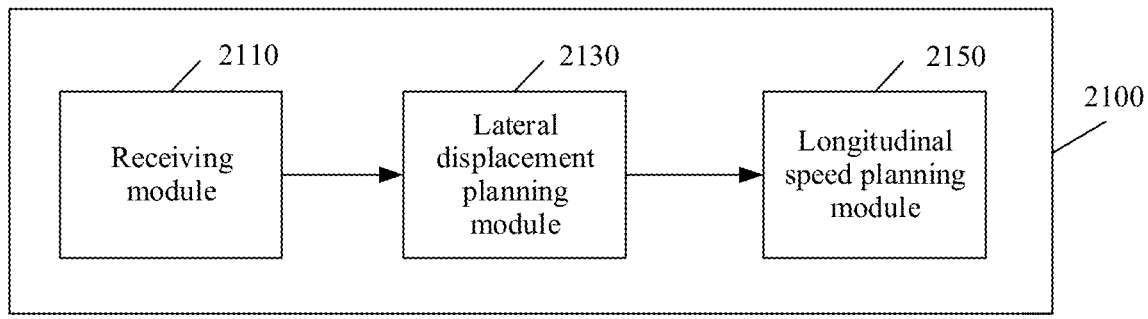
FIG. 21 is a schematic diagram of a structure of a trajectory planning apparatus according to an embodiment of this disclosure.

As shown in FIG. 21, an embodiment of this application provides a trajectory planning apparatus 2100, applied to an autonomous driving vehicle. The apparatus 2100 includes:

a receiving module 2110, configured to receive perception data, positioning data, and map information;

a lateral displacement planning module 2130, configured to obtain a preliminary traveling trajectory of the autonomous driving vehicle based on the perception data, the positioning data, and the map information, where the preliminary traveling trajectory includes N road points, each of the N road points includes first point information of the road point, the first point information includes coordinates of the road point and an allowable lateral error of the road point, the allowable lateral error indicates a lateral displacement error value allowed at the road point, and N is a positive integer greater than 1; and a longitudinal speed planning module 2150, configured to predict a drivable speed of the autonomous driving vehicle at each of n road points of the N road points based on traffic road condition information, the perception data, and the preliminary traveling trajectory, to obtain a target traveling trajectory, where the target traveling trajectory includes the n road points, each of the n road points further includes second road point information of the road point, the second road point information includes a drivable speed of the autonomous driving vehicle at the road point, and n is a positive integer less than or equal to N.

Optionally, the lateral displacement planning module 2130 is specifically configured to:

obtain a reference trajectory based on the positioning data and the map information, where the reference trajectory includes $R_1$ reference road points and a width constraint, the $R_1$ reference road points are located on a center line of a lane in which the autonomous driving vehicle is currently located or on a deviation line of the center line, the width constraint is used for constraining, in an obstacle avoidance planning process, an offset of each reference road point from lateral displacement of a current location of the reference road point, and the deviation line is a line that deviates from a preset range of the center line;

perform obstacle avoidance planning on the reference trajectory based on the perception data, the $R_1$ reference road points, and the width constraint, and generate an obstacle avoidance trajectory, where the obstacle avoidance trajectory includes $R_2$ obstacle avoidance road points, and each of the $R_2$ obstacle avoidance road points includes coordinates of the obstacle avoidance road point; and determine, according to an allowable lateral error generation rule, an allowable lateral error corresponding to each of the $R_2$ obstacle avoidance road points, to obtain the preliminary traveling trajectory, where the N road points included in the preliminary traveling trajectory are the $R_2$ obstacle avoidance road points.

Optionally, after generating the obstacle avoidance trajectory, the lateral displacement planning module 2130 is further configured to:

perform trajectory smoothing processing on the obstacle avoidance trajectory, and generate a smooth trajectory, where the smooth trajectory includes $R_3$ smooth road points, and each of the $R_3$ smooth road points includes coordinates of the smooth road point; and correspondingly, the lateral displacement planning module 2130 is specifically configured to:

determine, according to the allowable lateral error generation rule, an allowable lateral error corresponding to each of the $R_3$ smooth road points, to obtain the preliminary traveling trajectory, where the N road points included in the preliminary traveling trajectory are the $R_3$ smooth road points.

Optionally, the longitudinal speed planning module 2150 is specifically configured to:

generate, based on the perception data, an ST diagram including an obstacle occupied area, where the ST diagram includes a T (time) axis and an S (displacement) axis, the ST diagram includes a law of relative displacement changing with time, and the relative displacement includes displacement of an obstacle relative to the autonomous driving vehicle; and determine, based on a preset algorithm and a speed upper limit, a location of a point $i_j$ in the ST diagram, where j is successively selected from 1 to n, to generate an ST planning curve that avoids the obstacle occupied area, the ST planning curve includes n points from $i_1$ to $i_n$, the n points are in a one-to-one correspondence with the n road points, and an S/T value corresponding to each of the n points in the ST diagram is the drivable speed of the autonomous driving vehicle at each of the n road points, where the speed upper limit is used for constraining a value range of the drivable speed in a process of generating the ST planning curve, and the speed upper limit is obtained based on the traffic road condition information and the preliminary traveling trajectory.

Optionally, before determining, based on the preset algorithm and the speed upper limit, the location of the point in the ST diagram, the longitudinal speed planning module 2150 is further configured to:

perform speed planning on each of the n road points based on the traffic road condition information, to obtain first speed constraints of the n road points;

obtain, based on an allowable lateral error of each of the n road points, second speed constraints, of the n road points, corresponding to the allowable lateral errors of the n road points; and determine that a speed constraint with a smallest value in a plurality of speed constraints included in each of the n road points is the speed upper limit, where the plurality of speed constraints include the first speed constraint and the second speed constraint.

Optionally, the longitudinal speed planning module 2150 is further configured to:

calculate a curvature of each road point based on each of the n road points and x road points adjacent to the road point, where x is a positive integer greater than 0; and obtain a third speed constraint of each road point based on the curvature of the road point and a maximum allowable lateral acceleration of the road point, where the plurality of speed constraints further includes the third speed constraint.

Optionally, the longitudinal speed planning module 2150 is specifically configured to: generate an allowable speed error of each of the n road points based on the ST diagram, the ST planning curve, and the speed upper limit, where the second road point information further includes the allowable speed error, and the allowable speed error is used for indicating a speed error allowed at each of the n road points.

Optionally, the longitudinal speed planning module 2150 is specifically configured to:

separately generate, in the ST diagram, an upper checkpoint upward and a lower checkpoint downward along the S axis for a point $i_{j+1}$, where the upper checkpoint and the lower checkpoint are determined based on an allowable longitudinal displacement error of the point $i_{j+1}$, the allowable longitudinal displacement error is a displacement error allowed at the point $i_{j+1}$ along a positive or negative direction of the S axis in the ST diagram, the point $i_{j+1}$ is a point at a next moment of the point $i_j$, the point $i_j$ is any point in the n points other than a point $i_n$, and duration of one moment is preset duration; and connect the point $i_j$ to the upper checkpoint to obtain a first slope, and connect the point $i_j$ to the lower checkpoint to obtain a second slope, where the first slope and the second slope are used for indicating an allowable speed error of a road point corresponding to the point $i_j$.

Embodiment 6

Figure 22:
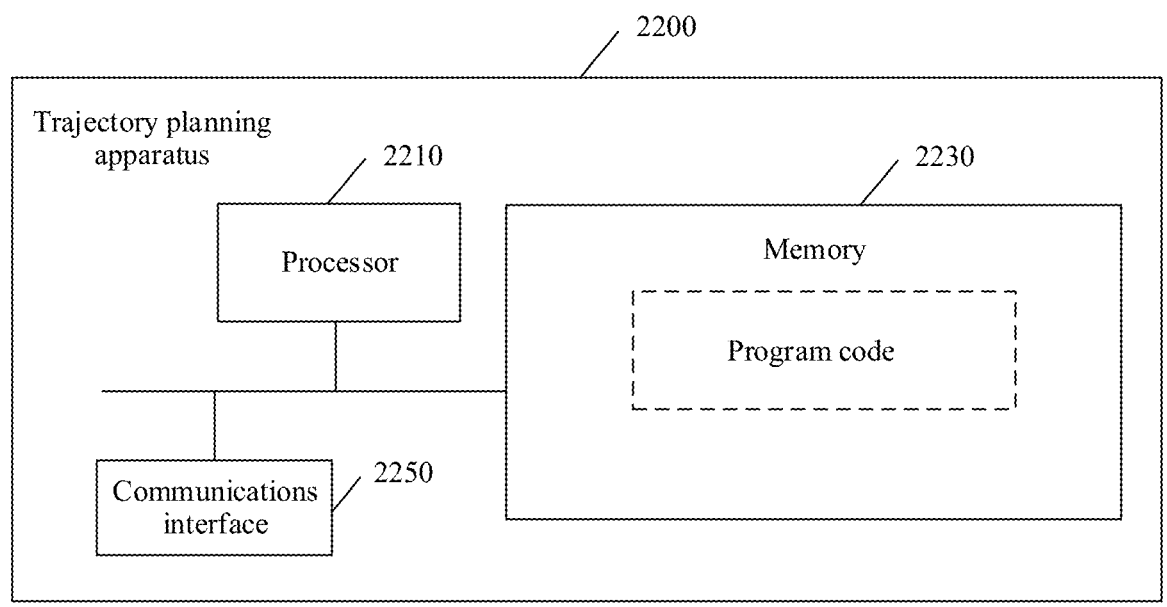
FIG. 22 is a schematic diagram of a structure of another trajectory planning apparatus according to an embodiment of this disclosure.

A trajectory planning apparatus 2200 shown in FIG. 22 may be implemented by using a structure in FIG. 22. The trajectory planning apparatus 2200 includes at least one processor 2210, at least one memory 2230, and at least one communications interface 2250. The processor 2210, the memory 2230, and the communications interface 2250 are connected and communicate with each other by using a communications bus.

The processor 2210 may be a general-purpose central processing unit (CPU), a microprocessor, an application-specific integrated circuit (ASIC), or one or more integrated circuits configured to control execution of the foregoing solution program.

The communications interface 2250 is configured to communicate with another device or another communications network, for example, the Ethernet, a radio access network (RAN), a wireless local area network (WLAN), and the like.

The memory 2230 may be a read-only memory (ROM), another type of static storage device that can store static information and instructions, a random access memory (RAM), or another type of dynamic storage device that can store information and instructions, or may be an electrically erasable programmable read-only memory (EEPROM), a compact disc read-only memory (CD-ROM), another optical disc storage, an optical disc storage (including a compact disc, a laser disc, an optical disc, a digital versatile disc, a Blu-ray disc, and the like), a disk storage medium or another magnetic storage device, or any other medium that can be used to carry or store expected program code in a form of instructions or a data structure and that can be accessed by a computer, but is not limited thereto. The memory may exist independently, and is connected to the processor by using the bus. Alternatively, the memory may be integrated with the processor.

The memory 2230 is configured to store application program code used to execute the foregoing solution, and the processor 2210 controls the execution. The processor 2210 is configured to execute the application program code stored in the memory 2230.

The code stored in the memory 2230 may be used to execute the trajectory planning method provided above, including: receiving perception data, positioning data, and map information;
  obtaining a preliminary traveling trajectory of the autonomous driving vehicle based on the perception data, the positioning data, and the map information, where the preliminary traveling trajectory includes N road points, each of the N road points includes first point information of the road point, the first point information includes coordinates of the road point and an allowable lateral error of the road point, the allowable lateral error indicates a lateral displacement error value allowed at the road point, and N is a positive integer greater than 1; and
  predicting a drivable speed of the autonomous driving vehicle at each of n road points of the N road points based on traffic road condition information, the perception data, and the preliminary traveling trajectory, to obtain a target traveling trajectory, where the target traveling trajectory includes the n road points, each of the n road points further includes second road point information of the road point, the second road point information includes a drivable speed of the autonomous driving vehicle at the road point, and n is a positive integer less than or equal to N.

It should be noted that, for ease of description, the foregoing method embodiments are expressed as combinations of a series of actions. However, a person skilled in the art should know that this application is not limited to the described action sequence, because according to this application, some steps may be performed in other sequences or performed simultaneously. In addition, a person skilled in the art should also know that all embodiments described in the specification are example embodiments, and the related actions and modules are not necessarily mandatory to this application.

In the foregoing embodiments, description of embodiments has respective focuses. For a part that is not described in detail in an embodiment, refer to related description in another embodiment.

In several embodiments provided in this application, it should be understood that the disclosed apparatuses may be implemented in other manners. For example, the described apparatus embodiment is merely an example. For example, the module division is merely logical function division and may be other division in an actual implementation. For example, a plurality of modules or components may be combined or integrated into another system, or some features may be ignored or not performed. In addition, the shown or discussed mutual couplings or direct couplings or communications connections may be implemented through some interfaces. The indirect couplings or communications connections between the apparatuses or modules may be implemented in electrical or other forms.

The modules described as separate parts may or may not be physically separate, and parts displayed as modules may or may not be physical modules, may be located in one position, or may be distributed on a plurality of network modules. Some or all the modules may be selected based on an actual requirement to achieve the objectives of the solutions of embodiments.

In addition, functional modules in embodiments of this application may be integrated into one processing module, or each of the modules may exist alone physically, or two or more modules are integrated into one module. The integrated module may be implemented in a form of hardware, or may be implemented in a form of a software function module.

When the integrated module is implemented in the form of a software functional module and sold or used as an independent product, the integrated unit may be stored in a computer-readable memory. Based on such an understanding, the technical solutions of this application essentially, or the part contributing to the conventional technology, or all or some of the technical solutions may be implemented in a form of a software product. The computer software product is stored in a memory and includes several instructions for instructing a computer device (which may be a personal computer, a server, a network device, or the like) to perform all or some of the steps of the methods described in embodiments of this application. The foregoing memory includes any medium that can store program code, for example, a USB flash drive, a read-only memory (ROM), a random-access memory (RAM), a removable hard disk, a magnetic disk, or an optical disc.

A person of ordinary skill in the art may understand that all or some of the steps of the methods in embodiments may be implemented by a program instructing related hardware. The program may be stored in a computer-readable memory. The memory may include a flash memory, a read-only memory (ROM for short), a random access memory (RAM for short), a magnetic disk, an optical disc, or the like.

Embodiments are described in detail above. The principle and implementations of this application are described in this specification by using specific examples. The description about embodiments is merely provided to help understand the method and core ideas of this application. In addition, a person of ordinary skill in the art makes variations to this application in terms of the specific implementations and application scopes based on the ideas of this application. Therefore, the content of this specification shall not be construed as a limitation on this disclosure.

What is claimed is:

1. A trajectory planning method for an autonomous driving vehicle, the method comprising:
  receiving perception data, positioning data, and map information;
  determining a preliminary traveling trajectory of the autonomous driving vehicle based on the perception data, the positioning data, and the map information, wherein the preliminary traveling trajectory comprises N road points, N being a positive integer greater than 1, wherein each respective road point of the N road points comprises first point information of the respective road point that includes coordinates of the respective road point and an allowable lateral error of the respective road point, the allowable lateral error indicating a lateral displacement error value allowed at the respective road point;

predicting a drivable speed of the autonomous driving vehicle at each of a subset of the N road points based on traffic road condition information, the perception data, and the preliminary traveling trajectory, the subset of the N road points comprising n road points, where n is a positive integer less than or equal to N; and generating a target traveling trajectory comprising the n road points, each respective road point of the n road points comprising second road point information, the second road point information comprising a drivable speed of the autonomous driving vehicle at the respective road point, wherein the predicting a drivable speed of the autonomous driving vehicle at each of the subset of the N road points based on traffic road condition information, the perception data, and the preliminary traveling trajectory comprises:

generating, based on the perception data, an ST diagram comprising an obstacle occupied area, the ST diagram comprising a T (time) axis and an S (displacement) axis, the ST diagram comprising a law of relative displacement changing with time, the relative displacement comprising displacement of an obstacle relative to the autonomous driving vehicle, and determining, based on a preset algorithm and an speed upper limit, a location of a point $i_j$ in the ST diagram, wherein j is successively selected from 1 to n to generate an ST planning curve that avoids the obstacle occupied area, the ST planning curve comprising the n road points $i_1$ to $i_n$, and an S/T value corresponding to each of the n points in the ST diagram, the S/T value being the drivable speed of the autonomous driving vehicle at each of the n road points, wherein the speed upper limit constraining a value range of the drivable speed in a process of generating the ST planning curve, and the speed upper limit is obtained based on the traffic road condition information and the preliminary traveling trajectory.

2. The method according to claim 1, wherein the obtaining a preliminary traveling trajectory of the autonomous driving vehicle comprises:

obtaining a reference trajectory based on the positioning data and the map information, wherein the reference trajectory comprises reference road points and a width constraint, the reference road points being located on a center line of a lane in which the autonomous driving vehicle is currently located or on a deviation line from the center line, the width constraint limiting, in an obstacle avoidance planning process, an offset of each reference road point from lateral displacement of a current location of the reference road point, the deviation line being a line that deviates from a preset distance from the center line;

performing obstacle avoidance planning on the reference trajectory based on the perception data, the reference road points, and the width constraint, and generating an obstacle avoidance trajectory comprising obstacle avoidance road points, each of the obstacle avoidance road points comprising coordinates of the obstacle avoidance road point; and determining, according to an allowable lateral error generation rule, an allowable lateral error corresponding to each of the obstacle avoidance road points to obtain the preliminary traveling trajectory, wherein the N road points included in the preliminary traveling trajectory are the obstacle avoidance road points.

3. The method according to claim 2, wherein after the generating an obstacle avoidance trajectory, the method further comprises:

performing trajectory smoothing processing on the obstacle avoidance trajectory, and generating a smooth trajectory, wherein the smooth trajectory comprises smooth road points, and each of the smooth road points comprises coordinates of the smooth road point; and the determining, according to an allowable lateral error generation rule, an allowable lateral error corresponding to each of the obstacle avoidance road points to obtain the preliminary traveling trajectory comprises:

determining, according to the allowable lateral error generation rule, an allowable lateral error corresponding to each of the smooth road points to obtain the preliminary traveling trajectory, wherein the N road points included in the preliminary traveling trajectory are the smooth road points.

4. The method according to claim 1, wherein before the determining a location of a point $i_j$ in the ST diagram, the method further comprises:

performing speed planning on each of the n road points based on the traffic road condition information, to obtain first speed constraints of the n road points;

obtaining, based on an allowable lateral error for each of the n road points, second speed constraints, of the n road points, corresponding to the allowable lateral errors of the n road points; and determining that a speed constraint with a smallest value in a plurality of speed constraints included in each of the n road points is the speed upper limit, wherein the plurality of speed constraints comprise the first speed constraint and the second speed constraint.

5. The method according to claim 4, wherein determining a location of a point $i_j$ in the ST diagram, the method further comprises:

calculating a curvature of each respective road point based on each of the n road points and x road points adjacent to the respective road point, where x is a positive integer greater than 0; and obtaining a third speed constraint of each respective road point based on the curvature of the respective road point and a maximum allowable lateral acceleration of the respective road point, the third speed constraint being included in the plurality of speed constraints.

6. The method according to claim 1, the method further comprising:

generating an allowable speed error for each of the n road points based on the ST diagram, the ST planning curve, and the speed upper limit, the second road point information further comprising the allowable speed error, the allowable speed error indicating a speed error allowed at each of the n road points.

7. The method according to claim 6, wherein the generating an allowable speed error for each of the n road points comprises:

generating, in the ST diagram, an upper checkpoint upward and a lower checkpoint downward along the S axis for a point $i_{j+1}$, wherein the upper checkpoint and the lower checkpoint are determined based on an allowable longitudinal displacement error of the point $i_{j+1}$, the allowable longitudinal displacement error is a displacement error allowed at the point $i_{j+1}$ along a positive or negative direction of the S axis in the ST diagram, the point $i_{j+1}$ is a point at a next moment of the point $i_j$, the point $i_j$ is any point in the n points other than a point $i_n$, and duration of one moment is preset duration; and connecting the point $i_j$ to the upper checkpoint to obtain a first slope, and connecting the point $i_j$ to the lower checkpoint to obtain a second slope, wherein the first slope and the second slope are used for indicating an allowable speed error of a road point corresponding to the point $i_j$.

8. A trajectory planning apparatus for an autonomous driving vehicle, the apparatus comprising:
a receiving module, configured to receive perception data, positioning data, and map information;
a lateral displacement planning module configured to obtain a preliminary traveling trajectory of the autonomous driving vehicle based on the perception data, the positioning data, and the map information, the preliminary traveling trajectory comprising N road points, N being a positive integer greater than 1, wherein each respective road point of the N road points comprises first point information of the respective road point, the first point information including coordinates of the respective road point and an allowable lateral error of the respective road point, the allowable lateral error indicating a lateral displacement error value allowed at the respective road point; and
a longitudinal speed planning module configured to:
predict a drivable speed of the autonomous driving vehicle at each of a subset of the N road points based on traffic road condition information, the perception data, and the preliminary traveling trajectory, to obtain a target traveling trajectory,
generate, based on the perception data, an ST diagram comprising an obstacle occupied area, the ST diagram comprising a T (time) axis and an S (displacement) axis, the ST diagram comprising a law of relative displacement changing with time, the relative displacement comprising displacement of an obstacle relative to the autonomous driving vehicle, wherein the subset of the N road points comprises n road points, wherein n is a positive integer less than or equal to N, wherein the target traveling trajectory comprises the n road points, wherein each respective road point of the n road points comprises second road point information, the second road point information including a drivable speed of the autonomous driving vehicle at the respective road point, and
determine, based on a preset algorithm and a speed upper limit, a location of a point $i_j$ in the ST diagram, wherein j is successively selected from 1 to n, to generate an ST planning curve that avoids the obstacle occupied area, the ST planning curve comprising the n road points $i_1$ to $i_n$, and an S/T value corresponding to each of the n road points in the ST diagram, the S/T value being the drivable speed of the autonomous driving vehicle at each of the n road points, wherein the speed upper limit constrains a value range of the drivable speed in a process of generating the ST planning curve, and wherein the speed upper limit is obtained based on the traffic road condition information and the preliminary traveling trajectory.

9. The apparatus according to claim 8, wherein the lateral displacement planning module is configured to:
obtain a reference trajectory based on the positioning data and the map information, the reference trajectory comprising reference road points and a width constraint, the reference road points being located on a center line of a lane in which the autonomous driving vehicle is currently located or on a deviation line of the center line, the width constraint constraining, in an obstacle avoidance planning process, an offset of each reference road point from lateral displacement of a current location of the reference road point, the deviation line being a line that deviates from a preset range of the center line;
perform obstacle avoidance planning on the reference trajectory based on the perception data, the reference road points, and the width constraint, to generate an obstacle avoidance trajectory comprising a plurality of obstacle avoidance road points, each of the obstacle avoidance road points comprising coordinates of the obstacle avoidance road point; and
determine, according to an allowable lateral error generation rule, an allowable lateral error corresponding to each of the obstacle avoidance road points to obtain the preliminary traveling trajectory, the N road points included in the preliminary traveling trajectory being the obstacle avoidance road points.

10. The apparatus according to claim 9, wherein the lateral displacement planning module is configured to:
perform trajectory smoothing processing on the obstacle avoidance trajectory and generate a smooth trajectory, the smooth trajectory comprising a plurality of smooth road points, each smooth road point comprising coordinates of the smooth road point; and
the lateral displacement planning module is configured to:
determine, according to the allowable lateral error generation rule, an allowable lateral error corresponding to each of the plurality of smooth road points to obtain the preliminary traveling trajectory, wherein the N road points included in the preliminary traveling trajectory are the smooth road points.

11. The apparatus according to claim 8, wherein the longitudinal speed planning module is further configured to:
perform speed planning on each of the n road points based on the traffic road condition information to obtain first speed constraints of the n road points;
obtain, based on an allowable lateral error of each of the n road points, second speed constraints of the n road points corresponding to the allowable lateral errors of the n road points; and
determine that a speed constraint with a smallest value in a plurality of speed constraints comprised in each of the n road points is the speed upper limit, wherein the plurality of speed constraints comprise the first speed constraint and the second speed constraint.

12. The apparatus according to claim 11, wherein the longitudinal speed planning module is further configured to:
calculate a curvature of each respective road point based on each of the n road points and x road points adjacent to the respective road point, wherein x is a positive integer greater than 0; and
obtain a third speed constraint of each respective road point based on the curvature of the respective road point and a maximum allowable lateral acceleration of the respective road point, wherein the plurality of speed constraints comprise the third speed constraint.

13. The apparatus according to claim 8, wherein the longitudinal speed planning module is configured to:
generate an allowable speed error of each of the n road points based on the ST diagram, the ST planning curve, and the speed upper limit, wherein the second road point information further comprises the allowable speed error, and the allowable speed error is used for indicating a speed error allowed at each of the n road points.

14. The apparatus according to claim 13, wherein the longitudinal speed planning module is configured to:

generate, in the ST diagram, an upper checkpoint upward and a lower checkpoint downward along the S axis for a point $i_{j+1}$, wherein the upper checkpoint and the lower checkpoint are determined based on an allowable longitudinal displacement error of the point $i_{j+1}$, the allowable longitudinal displacement error being a displacement error allowed at the point $i_{j+1}$ along a positive or negative direction of the S axis in the ST diagram, the point $i_{j+1}$ being a point at a next moment of the point $i_j$, the point $i_j$ being any point in the n points other than a point $i_n$, and duration of one moment is preset duration; and connect the point $i_j$ to the upper checkpoint to obtain a first slope, and connect the point $i_j$ to the lower checkpoint to obtain a second slope, the first slope and the second slope indicating an allowable speed error of a road point corresponding to the point $i_j$.

* * * * *